US010558866B2

(12) United States Patent
Potter et al.

(10) Patent No.: US 10,558,866 B2
(45) Date of Patent: Feb. 11, 2020

(54) SYSTEM AND METHOD FOR LIGHT AND IMAGE PROJECTION

(71) Applicant: Apple Inc., Cupertino, CA (US)

(72) Inventors: Daniel E. Potter, San Jose, CA (US); Clarisse Mazuir, San Jose, CA (US); Matthew E. Last, San Jose, CA (US); Ricardo da Silveira Cabral, Zurich (CH); Paul Furgale, Adliswil (CH); Christy F. Cull, Sunnyvale, CA (US); Daniel J. Reetz, Sherman Oaks, CA (US); Matisse J. Milovich, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/972,589

(22) Filed: May 7, 2018

(65) Prior Publication Data

US 2018/0253609 A1    Sep. 6, 2018

Related U.S. Application Data

(63) Continuation of application No. 15/747,821, filed as application No. PCT/US2016/044165 on Jul. 27, 2016, now abandoned.
(Continued)

(51) Int. Cl.
*B60Q 1/00* (2006.01)
*G06K 9/00* (2006.01)
(Continued)

(52) U.S. Cl.
CPC .......... *G06K 9/00791* (2013.01); *B60Q 1/08* (2013.01); *B60Q 1/2603* (2013.01); *G01S 17/88* (2013.01)

(58) Field of Classification Search
CPC .............................. G06K 9/00791; B60Q 1/08
(Continued)

(56) References Cited

U.S. PATENT DOCUMENTS

| 6,281,806 B1 * | 8/2001 | Smith | B60Q 1/085 340/901 |
| 7,429,918 B2 * | 9/2008 | Watanabe | B60Q 1/085 340/468 |

(Continued)

OTHER PUBLICATIONS

Krawczyk et al., "Contrast Restoration by Adaptive Countershading," EUROGRAPHICS, 2007, vol. 26, No. 3, 10 pages.

*Primary Examiner* — Tai T Nguyen
(74) *Attorney, Agent, or Firm* — Polsinelli PC

(57) ABSTRACT

Aspects of the present disclosure involve systems, methods, devices, and the like, for controlling the projection of an array of lights or an image from a headlight of a vehicle in response to information provided by one or more sensors or user inputs. The projection may be utilized to highlight an object in or near the path of travel of a vehicle. In another example, the headlight may be controlled to adjust the contrast across the field of view of the headlight. In addition, the system may project one or more images onto an object or surface either in the path of the vehicle or within the field of view of the headlight, projecting a "next step" in a series of navigation instructions onto the road, and/or projecting an indication of a movement of the vehicle to warn people around the vehicle of the movement of the vehicle. One or more visual effects may also be incorporated into the system to enhance the visibility of objects.

20 Claims, 17 Drawing Sheets

Related U.S. Application Data

(60) Provisional application No. 62/198,059, filed on Jul. 28, 2015.

(51) Int. Cl.
*B60Q 1/08* (2006.01)
*B60Q 1/26* (2006.01)
*G01S 17/88* (2006.01)

(58) Field of Classification Search
USPC ....... 340/436, 435, 438, 463, 468, 901–903; 381/104
See application file for complete search history.

(56) References Cited

U.S. PATENT DOCUMENTS

| | | | |
|---|---|---|---|
| 9,421,910 B1* | 8/2016 | Waltermann | B60Q 1/085 |
| 9,789,808 B1* | 10/2017 | Hong | B60Q 1/085 |
| 2007/0102214 A1* | 5/2007 | Wittorf | B60Q 1/50 |
| | | | 180/167 |
| 2010/0289632 A1 | 11/2010 | Seder et al. | |
| 2016/0291134 A1* | 10/2016 | Droz | G01S 7/4802 |

\* cited by examiner

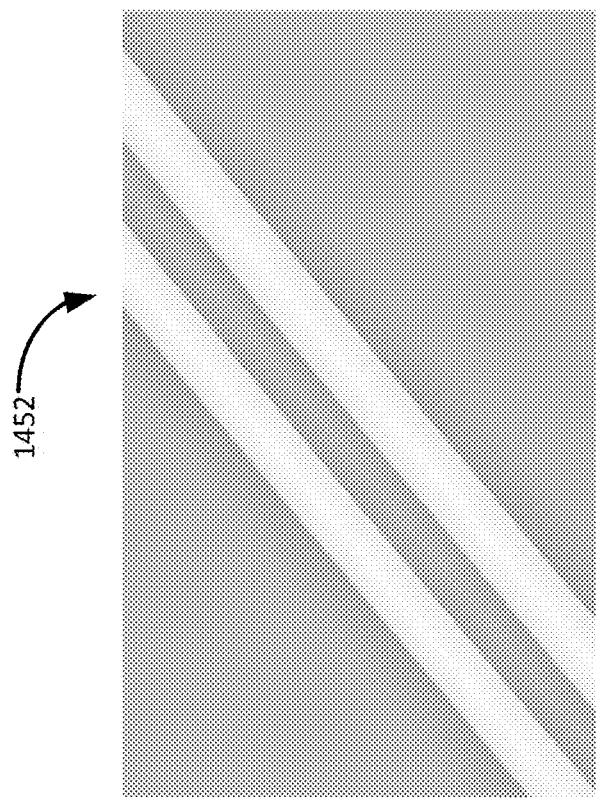
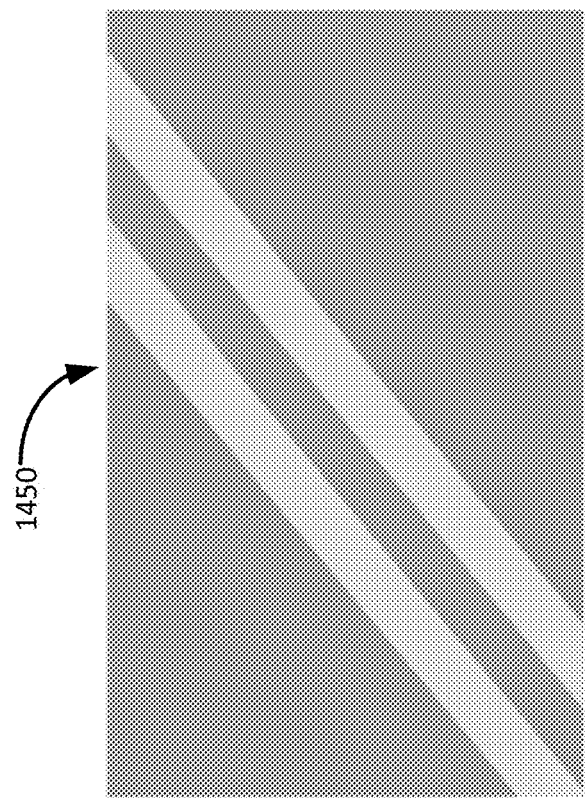
FIG. 14B

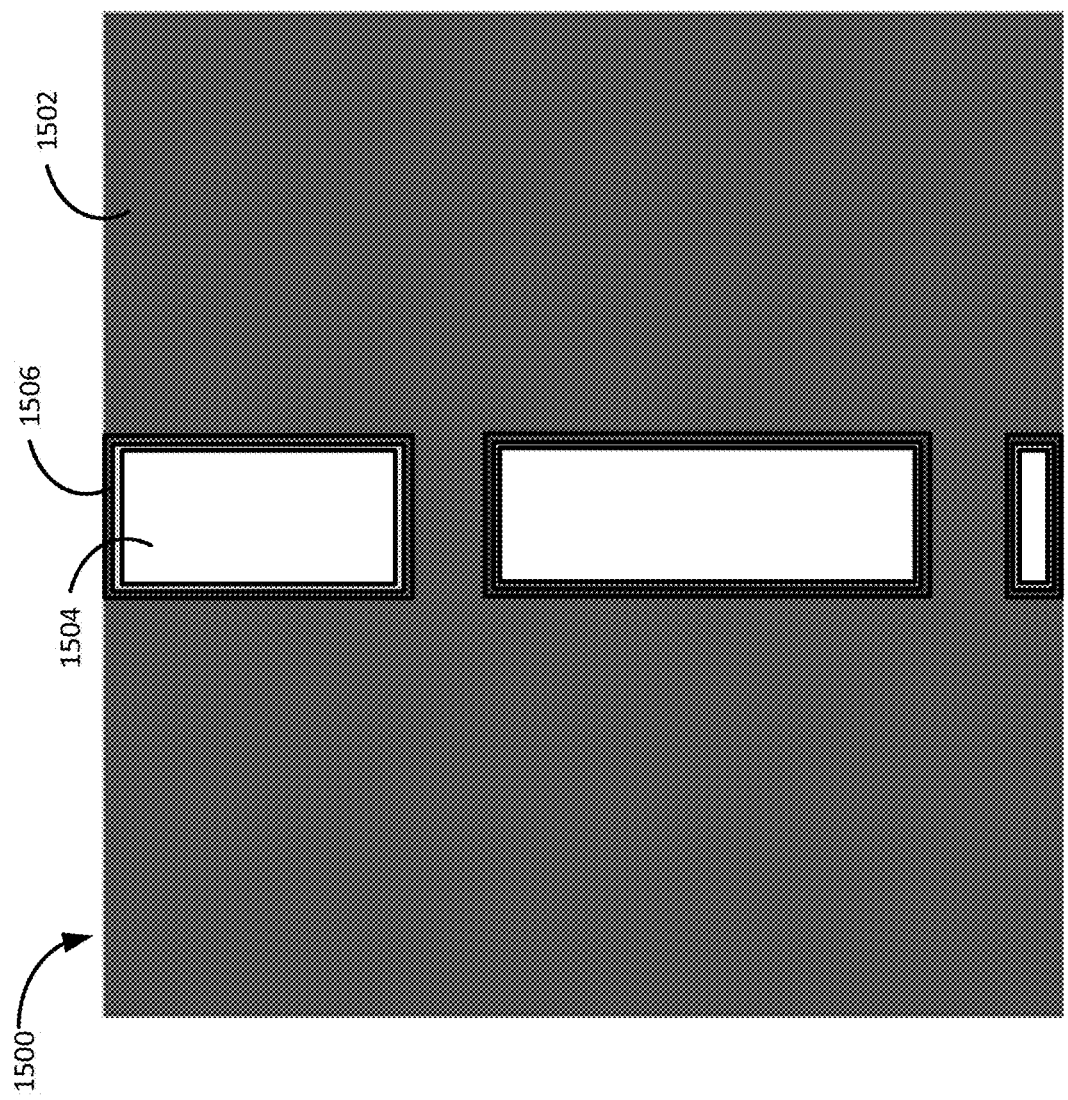

SYSTEM AND METHOD FOR LIGHT AND IMAGE PROJECTION

CROSS REFERENCE TO RELATED APPLICATIONS

This application is a continuation of U.S. patent application Ser. No. 15/375,905, filed Jan. 26, 2018, titled "SYSTEM AND METHOD FOR LIGHT AND IMAGE PROJECTION," now abandoned, which claims priority to International Patent Application No. PCT/US2016/0441165, filed Jul. 27, 2016, titled "SYSTEM AND METHOD FOR LIGHT AND IMAGE PROJECTION," now expired. International Patent Application No. PCT/US2016/0441165 claims priority under 35 U.S.C. § 119(e) to U.S. Provisional Patent Application No. 62/198,059, filed Jul. 28, 2015, titled "SYSTEM AND METHOD FOR LIGHT AND IMAGE PROJECTION," now expired, the entire contents of which are incorporated herein by reference for all purposes.

TECHNICAL FIELD

This disclosure relates generally to light and image projection, and more specifically to controlling the projection of an array of lights or an image from a headlight of a vehicle.

BACKGROUND

Many governing bodies require headlights to be installed and operational on many types of vehicles, such as automobiles, bicycles, trains, aircraft, and the like. Typically, the headlight is attached to the front of the vehicle and shines a uniform light onto the road or other surface in front of the vehicle. Many headlights utilize a light source (such as a light bulb) placed near the focus of a reflector of parabolic shape that reflects the lights through a forward-facing lens to guide the light beam to illuminate the road surface in front of the vehicle. Further, some headlight constructions may include a low beam setting and a high beam setting. However, traditional headlights often fail to properly illuminate the scene in front of the vehicle in particular circumstances, such as rural roads with little to no street light presence and in rainy or foggy conditions. It is with these and other issues in mind that various aspects of the present disclosure were developed.

SUMMARY

One implementation of the present disclosure may take the form of a method for illuminating a field of view for a vehicle. The method includes the operations receiving scene information of the field of view for the vehicle from one or more sensors in communication with a light controller, analyzing the scene information to detect the presence of an object in the field of view, and classifying the object using the scene information and a database of known object profiles. The method may also include the operations of predicting a location of the classified object within the field of view of the vehicle and projecting, utilizing the light controller, an illuminated indicator at the predicted location of the classified object in the field of view of the vehicle.

Another implementation of the present disclosure may take the form of a method for controlling a contrast in an illuminated scene. The method includes the operations of receiving scene information from one or more sensors in communication with a light controller, the scene information indicating a first reflectiveness of a first surface in a field of view of the one or more sensors and a first location of the first surface in the field of view of the one or more sensors and predicting a second location of the first surface within the field of view of the one or more sensors. The method may also include the operation of projecting, utilizing the light controller, a first level of illumination from a vehicle headlight onto the first surface at the predicted second location, wherein the first level of illumination is based at least on the received first reflectiveness, the first level of illumination being different than a second level of illumination projected from the vehicle headlight on a second surface in the field of view.

Yet another implementation of the present disclosure may take the form of system for illuminating a field of view for a vehicle. The system comprises a projection system projecting light onto the field of view of the vehicle, a sensor to detect objects within the field of view of vehicle, and a computing device executing one or more instructions that cause the computing device to perform operations. The operations include receiving a signal from the sensor indicating scene information of the field of view for the vehicle, and classifying the object using the scene information and a database of known object profiles. The operations also include predicting a location of the classified object within the field of view of the vehicle and instructing the projection system to project an illuminated indicator at the predicted location of the object in the field of view of the vehicle.

BRIEF DESCRIPTION OF THE DRAWINGS

FIGS. 14A and 14B are diagrams illustrating projecting illumination with a Cornsweet effect on a scene to enhance the visibility of lane markers on a road surface.

FIG. 15 is a diagram illustrating projecting illumination with a colored boundary on one or more images of a scene to enhance the visibility of objects within the scene.

DETAILED DESCRIPTION

Figure 1:
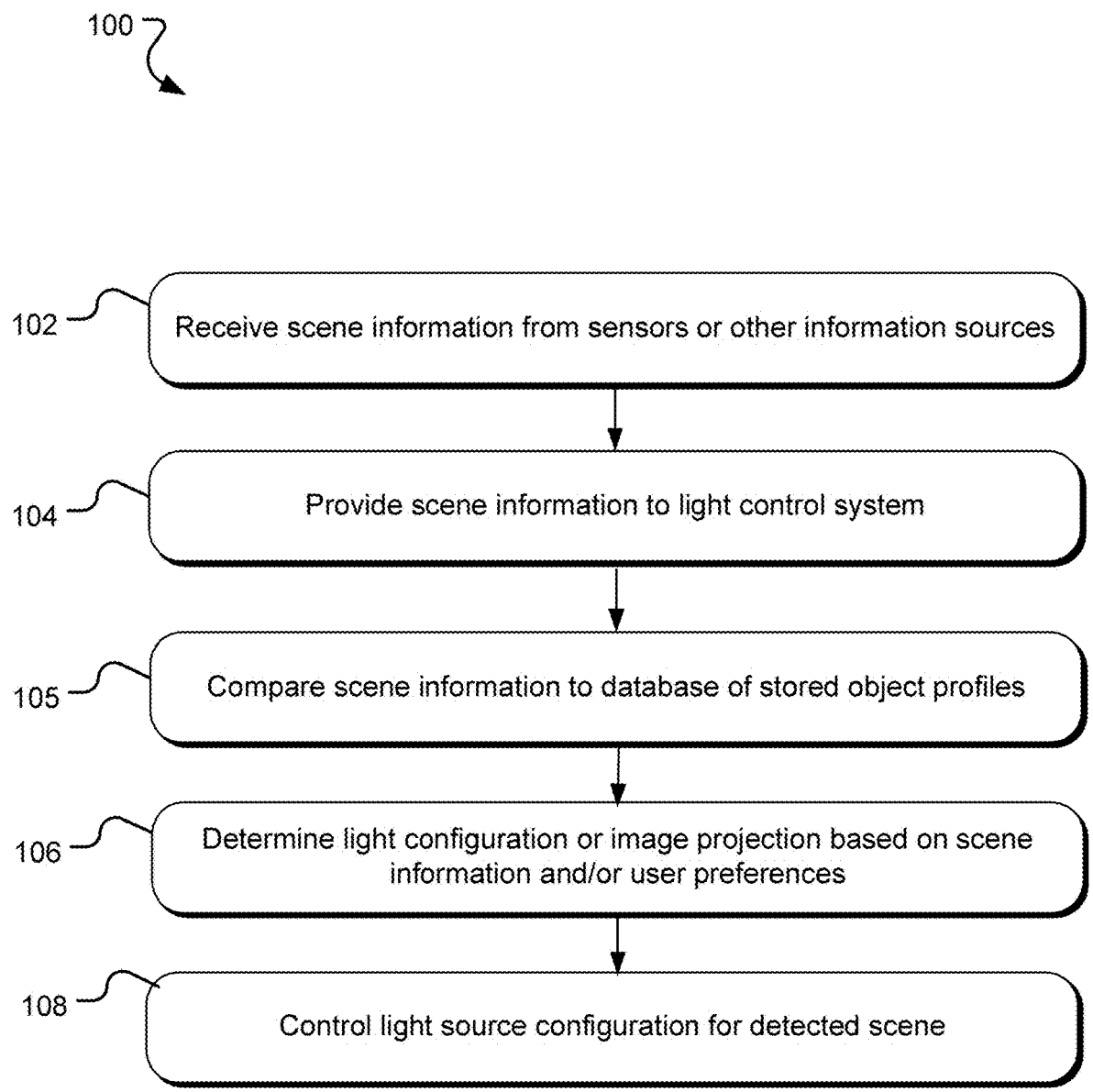
FIG. 1 is a flowchart of a method for adjusting a headlight of a vehicle based on information received from one or more sensors.

Aspects of the present disclosure involve systems, methods, devices, and the like, for controlling the projection of an array of lights or an image from a headlight system of a vehicle in response to information provided by one or more sensors or user inputs. The projection may be utilized to highlight particular areas within the field of illumination of the headlight. For example, the light source may be oriented or otherwise controlled to highlight a detected object in or near the path of travel of a vehicle. Such objects may include potential obstacles in the roadway in front of the vehicle, objects or beings off the road with the potential for entering the vehicle's path of travel, notable conditions of the road, and the like. In another example, the headlight system may be controlled to adjust the contrast across the field of view of the headlight. For example, a particular portion within the field of view of the headlight, such as a reflective traffic sign or reflective tape on a roadway, may be illuminated brighter than other portions within the field of view. In other words, more light may be projected on certain objects in the scene than other objects in the scene. In traditional headlight systems, a uniform light is projected from the headlight onto the scene. By controlling the contrast across the field of view of the headlight, portions of the field of view may be highlighted or have more light projected onto them than other portions in the field of view. The portions of the field of view with a higher contrast or with more light projected onto them may be determined from information received about the field of view of the headlight from one or more sensors. Further, in one embodiment, the high contrast portions may also be selectable by a user of the vehicle based on the user's preferences. Through the control of the headlight system, an enhanced viewing experience for a user or driver of the vehicle may be obtained to increase the enjoyment and ease of the operation of the vehicle by the driver.

In some implementations, the headlight system may project one or more images onto a detected object either in the path of the vehicle or within the field of view of the headlight, projecting a "next step" in a series of navigation instructions onto the road, and/or projecting an indication of a movement of the vehicle to warn people around the vehicle of the movement of the vehicle. In other implementations, the projecting device may receive information about the field of view of the headlight and generate a mask or other image to project onto the field of view. Such a mask may be used to highlight or otherwise improve the visibility of some portions or objects in the field of view, such as lane markers on the road compared to other portions of the scene. In general, any image may be projected onto the road or another surface by the projecting device in the headlight to improve the vehicle user's experience.

In still other embodiments, the response to a detected object or other light projection circumstance described above may not involve a projected light or image from a headlight. Rather, an image or light may be projected onto a heads-up display (HUD) visible by the driver of the vehicle. For example, images and other information may be projected onto the interior or exterior surface of the windshield of the vehicle. In another example, the HUD may be a helmet or other wearable device that includes a surface onto which an image may be projected or shown. In this embodiment, when an object is detected by the system, the object may be highlighted on the HUD as the driver is looking through the HUD at the object. In another example, the projected image of the "next step" in a series of navigation instructions may be displayed or projected onto the HUD. Thus, the determined images or illuminations discussed herein as projected onto the road may also or otherwise be projected onto a HUD visible by the driver of the vehicle.

The type and manner of the image or light projected into the driver's (or any other person in or near the vehicle) field of view may vary depending on many factors. In particular, such illuminations may be selected to alert the driver of the vehicle of an object or surface in a scene without overly distracting the driver's attention. Also, the response illuminations may be selected to not scare or startle a living being upon which the illumination is projected. In yet another example, the illuminations may be dependent upon one or more user, driver, or passenger preferences. Thus, although many variations of projected illuminations and images are discussed below, the type and manner of the projections may vary based on user experience and measured responses by the viewer and/or the detected object. In certain embodiments, visual effects or illusions may be utilized by the system to further enhance the perception of objects within a scene to a driver or other viewer of the scene. Through the application of various effects on the illuminated scene, the perception of objects or surfaces within the scene may be increased to improve the visualization of objects by an observer.

Although discussed herein in reference to a vehicle with a driver, it should be appreciated that the systems, methods, and effects discussed may be utilized with any type of vehicle with an illumination system, such as driver-controlled vehicle, semi-autonomous vehicles, and/or fully autonomous vehicles. For example, the embodiments described herein may be used to selectively illuminate or emphasize certain objects in response to a request from an autonomous driving system. As a further example, an autonomous vehicle may use camera sensors that may be assisted by using selective illumination as provided by the embodiments described herein. Further, the embodiments discussed herein may reference the field of view of an illumination system of a vehicle when applying an illumination to a scene. In general, the field of view of the illumination system as used herein includes any portion external to a vehicle upon which the illumination system may project a light or image. This includes objects and surfaces in front of a vehicle, as well as objects and surfaces to the side and behind the vehicle. Also, the illumination effects discussed may be viewed or otherwise experienced by any person. In yet other embodiments, the illumination system and methods discussed may be utilized by any mobile mechanical or computing device that illuminates a scene from a light source, such as mobile communication devices or flashlight devices.

Beginning with FIG. 1, a flowchart of a method for adjusting a headlight system of a vehicle based on information received from one or more sensors is shown. The operations may be performed by a headlight control system to increase the environmental awareness of the driver of a vehicle and/or improve the driving experience of the vehicle. Further, although discussed below with reference to a headlight system, the operations may also be performed to create images on a HUD in communication with the driver or any other type of display a driver may be using to operate the vehicle. Thus, the control of the headlight discussed below may also apply to control of other display devices.

In operation 102, the light control system receives information of a scene from one or more sensors and/or from other information sources. In general, the scene information includes presence information and location of objects and surfaces within a field of view of a headlight or vehicle and may include raw sensor data and/or data that has been processed, e.g. using an object detection algorithm. For example, a thermal infra-red sensor on the vehicle may detect an object, such as a deer, within a field of view of the sensor and/or headlight of a vehicle. The presence and location of the object within the field of view, or the "scene", is obtained by the sensor and provided to the light control system in operation 104. In another embodiment, scene information not within the field of view of the headlights may be obtained by the one or more sensors. For example, objects located on the side or behind a vehicle may be detected by the sensors or information sources. In such an embodiment, the presence and location of objects may, nonetheless, be provided to the light control system and maintained for future use by the system or discarded by the system until the detected objects and/or surfaces fall within the headlight or vehicle driver field of view.

In general, any type of sensor that obtains information of the presence, condition, type and/or location of an object or surface may be utilized to gather scene information and provide such information to a light control system. As mentioned above, one such sensor may include a thermal infra-red camera that detects the presence of a heat source within the field of view of the camera. Another sensor that may be used by the headlight system is a Light Detection and Ranging (LIDAR) detector that measures a distance to an object by illuminating the object with a laser and analyzing the light reflected back off the object. Similarly, a Radio Detection and Ranging (RADAR) detector may be used by the system. Other sensors include, but are not limited to, millimeter wave cameras, stereo imaging sensors, structured light sensors, non-imaging photo-detectors, and the like. In yet another implementation, the sensor may determine a condition of one or more of the objects or surfaces within the field of view of the sensors. For example, a sensor to determine a condition of the surface of a road, whether the road is dry, wet, icy, oily, etc., may be utilized. Another sensor of the system may detect the reflectiveness of one or more surfaces within the field of view, such as a reflective traffic sign, reflective strips located on the road surface, and/or reflective clothing on a pedestrian or biker.

In addition to scene information obtained from one or more sensors, other information sources may also be utilized by the system to determine objects and conditions within a field of view of a headlight. For example, the geographic location of the vehicle, and more particularly, the geographic position of the headlight, may be determined and provided to the light control system. With the location of the headlight known, scene information and optical properties of the known location may then be retrieved by or provided to the control system from a database of scene information categorized by location and headlight orientation. Also, geographic information may be obtained from a Global Positioning System (GPS) device, including the orientation and direction of one or more roads around the vehicle. A navigation route from the GPS device or other navigation device may also be provided to the light control system. In general, any information about a scene or about the vehicle that includes the light control system based on the vehicle's location may be provided by a source other than the one or more sensors discussed above.

As mentioned above, the scene information obtained by the sensors includes presence information and location of objects and surfaces within a field of view of a headlight or vehicle. In operation 105, the vehicle or light control system may compare the scene information to one or more databases of profiles of known objects. For example, a thermal infra-red camera may provide information about a detected object in the scene. The control system, upon receiving the information, may access a database of known thermal profiles of objects and compare the received information to the stored profiles. Through this comparison, the control system may determine a type for the object, such as whether the detected object is a human, a car, a deer, a street light, etc. In this manner, the light control system may determine a type of detected object within the scene based on the scene information provided by the sensor. In general, the vehicle systems may maintain a database of known objects and profile information for such objects. In one example, the object profiles stored in the database may be provided from a central storage database accessed through a wireless network by the vehicle, either during operation of the vehicle or during a power-down state. In another example, all or some of the objects detected by the sensors of the vehicle may be stored in the database. In this manner, the database of object profiles may be updated with new object profiles, either from the central database or from information received from the sensors of the vehicle.

In general, the comparison of the scene information to the object profiles within the database may include a certainty calculation that indicates how closely the received information matches the stored object profiles. As explained in more detail below, the operation of the illumination system may be based on the determined type of object from the comparison to the stored object profiles. In some instances, the operation of the illumination system may also be based on the certainty calculation obtained from the comparison.

It should be appreciated that the scene information may be provided by the one or more sensors and/or the additional sources many times per second. Thus, as the vehicle is in motion, the changes within the scene may be monitored and tracked by the light control system to determine one or more objects or surfaces present in the field of view of the headlight. As described in more detail below, tracking of the objects as the vehicle is in motion allows the system to determine the type of object and the type of visual response the system applies for the detected object and, in some instances, predict the future position of the object within the field of view based on the velocity and movement of the vehicle and/or the movement of the object. Further, scene information may be provided and processed by the system at a rate that exceeds the visual response by a driver of the vehicle. In this manner, the system may respond to objects potentially faster than a human driver may detect and respond to the presence of the object in the scene.

With the scene information and/or user preferences received, the light control system may determine a configuration of one or more light sources in operation 106. In one embodiment, the light configuration is determined in response to the received scene information. For example, many vehicles include a headlight, headlamp, or other illumination system to illuminate a scene in front of the vehicle in circumstances where the ambient light is low. Typically, headlight structures include a light source and one or more reflector surfaces to create a beam of light projected onto the scene. Headlight light sources may include any type of light source, but often include halogen or other types of light bulbs, an array of light emitting diodes (LEDs), laser lights, and the like. More advanced headlights may include systems to control the projected light beam, including leveling systems, beam switching systems to switch from a first light source to a second light source, and adaptive headlights that orient the beam based on a change of direction of the vehicle. Various particular light sources and illumination systems that may be utilized to perform the described operations are discussed in more detail below with reference to FIG. 13.

In an implementation where the light source of the headlight is an array of lights (such as an array of LEDs), controlling the light system may include controlling the illumination of one or more of the array of lights, including an intensity of illumination and/or a color of light from the one or more of the array of lights. In an implementation where the light source is a light projector or laser projector, controlling the light system may include controlling a projector to project an image at an estimated location in the field of view of the headlight. In this manner, the light control system determines what is to be projected into the field of view of the headlight, the location of the projection, and the light source configuration used. In operation 108, the light control system applies the projected illumination to the light source, such as the headlight light source of the vehicle, in response to the scene information received. The projected illumination includes an illumination indicator projected onto the detected object to highlight or otherwise indicate the object within the scene to a viewer of the scene. The different types and effects that are included in the illumination indicator projected onto the object are discussed in greater detail below.

Figure 2:
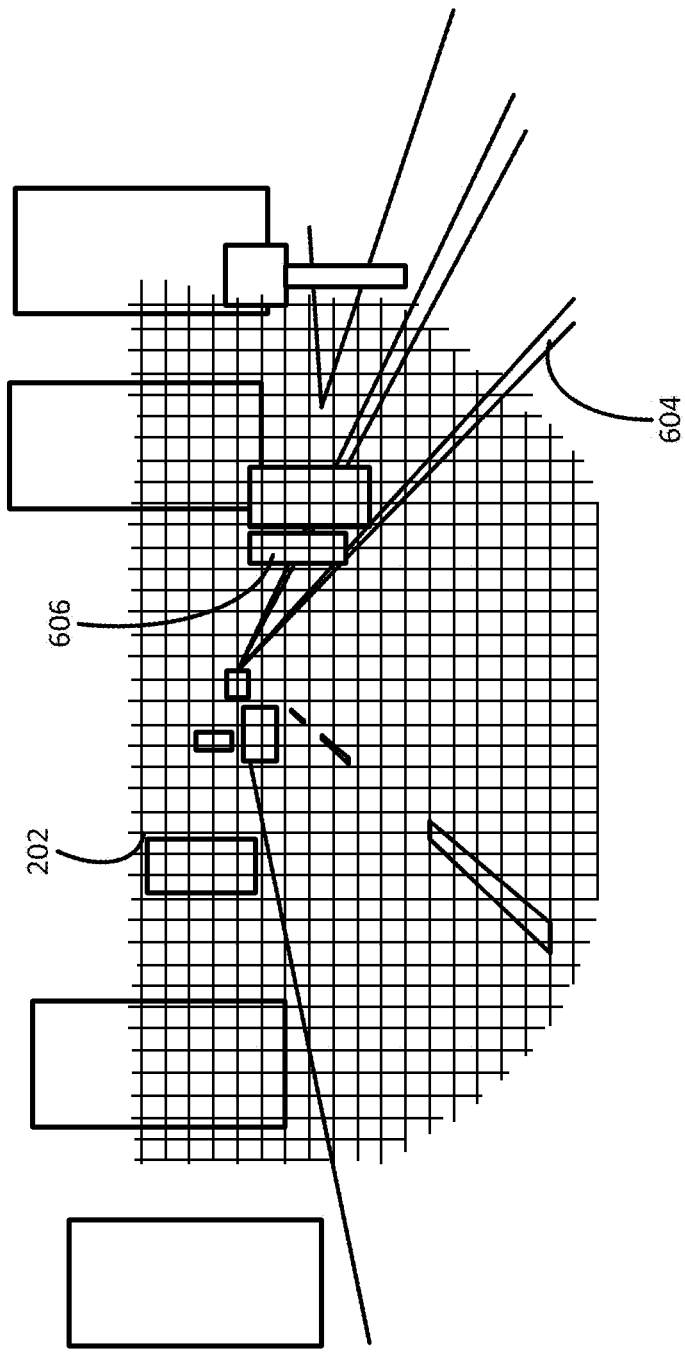
FIG. 2 is a diagram illustrating a pixilation of a field of view of a headlight of a vehicle for use in projecting an image onto the field of view.

FIG. 2 is a diagram illustrating a pixilation of a field of view of a headlight of a vehicle for use in projecting an image onto the field of view. Through the use of the light control system described herein, the one or more pixels within the field of view 202 may be controlled to be illuminated or include no illumination. Further, the light control system may determine the intensity of light applied to each pixel of the field of view 202 and/or a color of the illuminated pixel. Through a combination of illuminated pixels, one or more objects within the field of view 202 may be illuminated and/or an image of some kind may be projected onto the field of view. Also, although illustrated in FIG. 2 as included several pixels in the field of view 202, it should be appreciated that any number of pixels may be applied to the field of view. For example, some headlight control systems may have a granularity of hundreds of thousands of pixels. In general, the higher the pixilation of the field of view 202, the more detailed the illumination of particular objects or surfaces within the field of view may be. Similarly, a higher pixel count within the field of view 202 provides a more detailed projected image from the headlight. Also, a HUD may include a pixel field of view 202 for displaying objects or images within the field of view by the operator of a vehicle.

Figure 3:
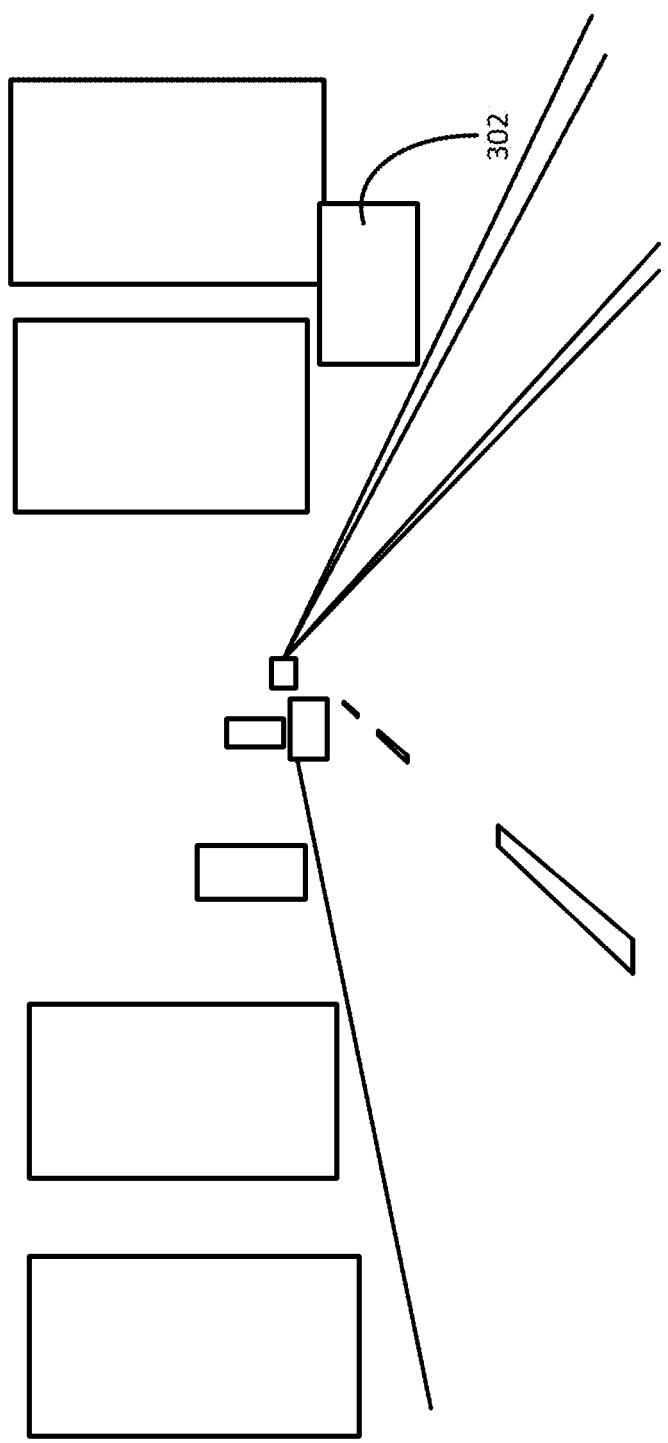
FIG. 3 is a diagram illustrating the use of a headlight system of a vehicle indicating a detected object in the field of view of the headlight.

As mentioned above, the light control system may be used to determine an object to a vehicle and highlight or otherwise indicate the presence of the object in the field of view of a headlight. In one example, the detected object may be a potential obstacle to the operation of the vehicle. FIG. 3 is a diagram illustrating a headlight of a vehicle indicating a detected object 302 in the field of view of the headlight. In the particular example shown, a thermal infra-red camera detects a deer 302 on the side of the road. This scene information is transmitted to a light control system that determines the deer as a potential obstacle 302. In response, the light control system controls the light array or projector of the headlight to produce a spotlight or other illumination indicator in the field of view of the headlight at the deer's position 302. In the embodiment of a HUD, the light control system may determine a line of sight from the driver of the vehicle to the object and provide an indicator on the HUD that is visually at or near the object when the object is viewed by the driver through the HUD. In this manner, potential obstacles to the operation of the vehicle may be identified by the light control system and some indication of the location of the object may be provided to the driver of the vehicle.

In a similar manner, objects in the pathway of the vehicle may also be indicated either through the configuration of the illumination of a field of view of a headlight or through a HUD. For example, to detect the presence of a large rock or other inanimate object in the road, one or more sensors, such as a LIDAR device, may detect the presence of the object. This scene information is transmitted to the light control system and one or more light illuminations are determined to highlight or otherwise indicate the detected object. In other words, a location of the object within the field of view of the headlight (or in a line of sight through a HUD) may be determined and some indicator may be projected onto the object. In this way, any object detected by the light control system may be determined, located, and indicated to the driver to improve the driver's reaction to the presence of the object.

As discussed above, the indication of the object in the scene may include many kinds of indicators. For example, the light projected onto the object may be colored to indicate a level or type of obstacle, such as a red light to indicate a high priority object. In another example, the light projected may flash or blink to indicate the presence of the object. Further, the indicator may not be projected directly onto the object. In some implementations, an arrow may be projected onto the road or the HUD that points to the location of the object. The indicator arrow may also be colored or may flash. Multiple colors may also be used. In another implementation, an indicator may be projected near the object so as not to scare or annoy the detected object, particularly if the object is a living being. For example, a light may be projected near the deer so as not to scare the deer to run into the path of the vehicle. Similarly, a red line may be projected near a runner on the side of the road to provide a safe path to drive the vehicle to avoid striking the runner. Also, the type of indicator projected may be based on the type of object detected. For example, a red circle may be used to indicate a rock or other debris in the path of the vehicle, while an arrow is used to distinguish an animal or human near the path of the vehicle. Further still, more than one object may be detected and indicated within the headlight field of view, possibly with different indicators on the various detected objects. In general, any combination of images, lights, colors, blinking, and location may be utilized to indicate the detection of objects in the field of view of the headlight or the driver.

As should be appreciated, there may be latency between the detection of the object in the field of view of the headlight and the projection of an indicator on the detected object. In other words, some time interval may elapse during the processing of the object and the light control system response to the object detection. Further, during the latency period, the location of the object may move to another location in the field of view of the headlight due to the movement of the vehicle and/or the movement of the object itself. Thus, in some implementations, the light control system may account for the latency of the system when determining the location of the indicator of the object in the field of view of the headlight. In one particular instance, the latency of the system may be fast enough that the adjustment to the location of the indicator in the field of view is small. In other instances, however, the latency may be large enough that the system may attempt to predict the position of the object when the indicator is projected into the field of view.

Further, the location of an object near the edge of the field of view of the headlight may change more rapidly than an object near the center of the field of view as the vehicle approaches the object. To account for this effect, the system may determine or otherwise know the velocity vector representing the speed and direction of the vehicle relative to the detected object in the field of view of the headlight. The position of the object relative to the velocity vector of the vehicle may indicate the adjustment to the location of the object in the field of view of the headlight during the processing by the lighting system. In particular, the location within the field of view of the indicator of the objects away from the determined velocity vector of the vehicle may be adjusted by the system more than the location of the indicator for objects near the velocity vector of the vehicle during processing. In this manner, the system may predict the position of the object within the field of view of the headlight for better accuracy of the indicator position. In some instances, this prediction may consider the velocity vector of the vehicle, the original detected position of the object in the field of view, the processing latency of the overall light control system, the type of object detected, and/or the movement of the detected object. Additional discussion of this latency adjustment to the indicator location is included below with reference to the tracking of the object through the field of view described in FIG. 4.

In addition to the indicator projected into the field of view of the headlight, the illumination of other portions of the field of view may also be controlled in response to the detected object. For example, to further highlight the object indicator in the headlight field of view, other portions of the headlight may be dimmed from a starting or normal illumination level to make the indicators appear brighter within the field of view. Such adjustment of the field of view of the headlight may occur when the indicator is provided within the headlight field of view or if the indicator is projected onto a HUD device.

In another implementation, the type of indicator projected into the field of view of the headlight may be based on a probability that a detected object is an obstacle. For example, through one or more sensors, the system may detect an object near the road that a vehicle is traveling along, such as another vehicle traveling in an opposite direction. However, the system may determine that the other vehicle is unlikely to cross into the path of the driver's vehicle. At this point, the system may associate a low probability that the other vehicle is an object and elect to not highlight or indicate the other vehicle. While tracking the movement of the other vehicle, the system may determine that the other vehicle is veering into the path of the driver's vehicle at some time. In some circumstances, the system may project a warning or indicator on the other vehicle to indicate a potential object of the other vehicle. Such an indication may further change or become more noticeable as the probability of the object being an obstacle becomes more likely. In this manner, the system may categorize objects determined by the sensors and apply an associated indicator based on the type of object and/or the probability of the object being an obstacle.

Scene information from the sources other than the sensors may also be utilized by the system to identify and classify objects. For example, one or more of the sensors may detect an upright tree within the current trajectory of the vehicle. However, a map of the road the vehicle is traveling on may indicate that a curve in the road is just ahead of the vehicle such that the tree would not be an object if the vehicle were to follow the road. In such an instance, the system may rate the potential of the tree being an object as low. Similarly, the sensors may detect one or more reflective surfaces indicating the curve of the road and demote or increase the probability of a detected object as being an object. In this manner, environmental information may be obtained or received by the system that indicates the path of the vehicle to aid in determining a probability of a detected object being an object to the vehicle.

As mentioned above, objects may be tracked as they pass through the field of view of the headlight. For example, if the vehicle is in motion, a stationary object will pass through the field of view of the headlight as the vehicle passes by the object. Returning to the diagram of FIG. 3, the detected object 302 is at a first location within the field of view of the headlight. However, if the object does not move and the vehicle continues along its trajectory, the object will move to the right within the headlight field of view, eventually passing out of the field of view as the vehicle passes the object. In a similar manner, a bicyclist on the side of the road going in the same direction as the vehicle will be detected at a first time and move through the field of view as the vehicle passes by the bicyclist. Thus, in one implementation, the system may track objects as the objects move through the field of view of the headlight.

Figure 4:
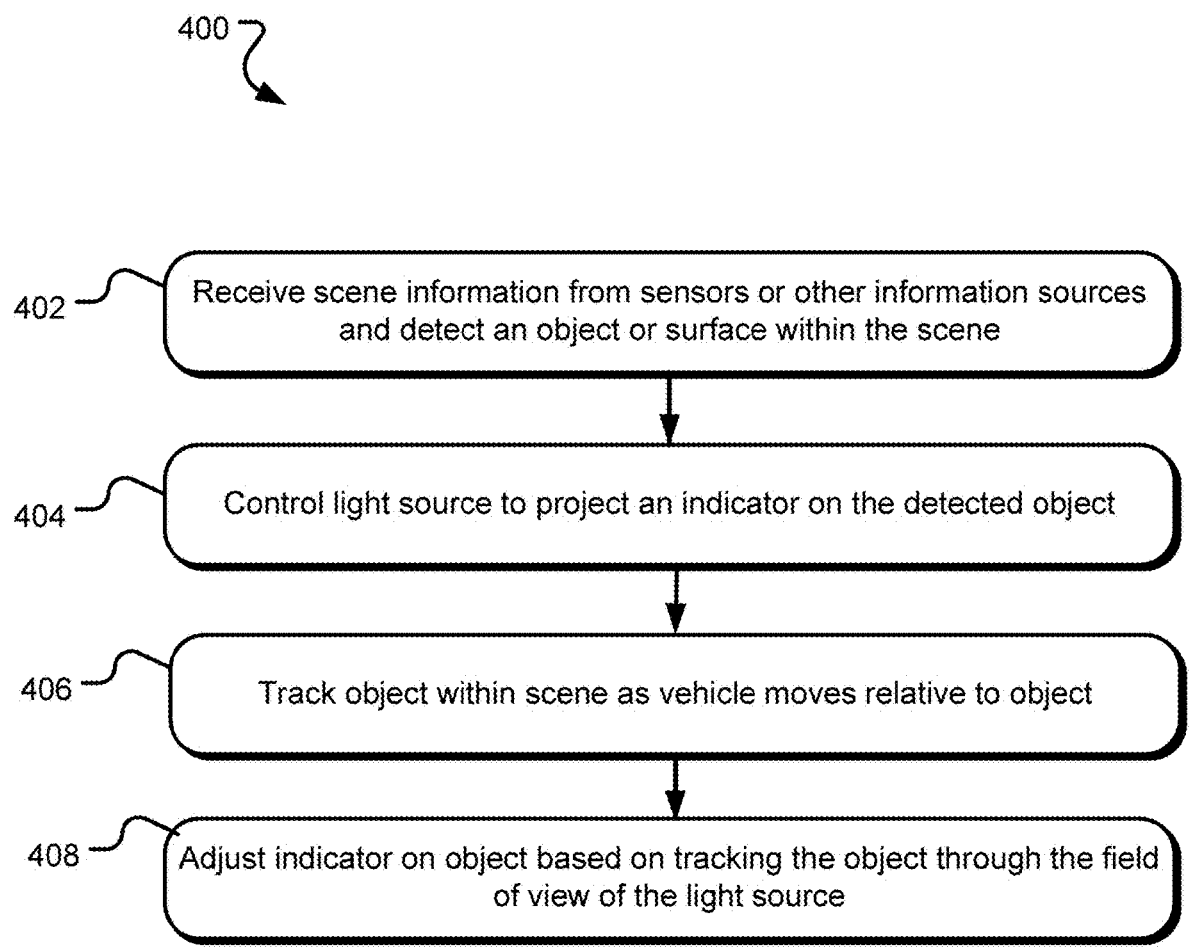
FIG. 4 is a flowchart of a method for tracking an object through a headlight field of view when a vehicle is in motion.

In particular, FIG. 4 is a flowchart of a method for tracking an object through a headlight field of view when a vehicle is in motion. The operations of FIG. 4 may be performed by the light control system of a vehicle and, more particular, of a headlight system of the vehicle. For example, the light control system may receive, in operation 402, scene information from one or more sensors and other information sources and detect the presence of an object or surface within the scene. In operation 404, the system may also control a light source, such as a headlight system, to provide an indicator on the object within the scene, as also described above.

The above operations may occur at a first time. In other words, the location of the object is detected within the scene at the first time and an indicator of the object is provided on or near the object within the field of view of the headlight. At a later time, the object is again detected within the field of view of the headlight. However, due to the movement of the vehicle with the light control system and/or the movement of the object itself, the location of the object at the second time in relation to the vehicle and/or headlight is different than the location in the field of view of the object at the first time. The change in the location of the object from one time to the next may be based on the type and movement of the detected object. For example, a stationary object on the side of the road of the vehicle may quickly pass through the field of view of the headlight while another vehicle moving in the same direction of the driver's vehicle may move slowly through the field of view of the headlight. By comparing scene information obtained at the first time to scene information obtained at the second time, the light control system may track objects as they move through the field of view of the headlight in operation 406. In one implementation, the light control system may conduct an object comparison from one scene frame to the next to correlate objects as the same object within the scene and track the movement of the object. Further, the system may determine or know the velocity vector of the vehicle relative to the detected object in the field of view of the headlight. The position of the object relative to the velocity vector of the vehicle may indicate how quickly the object is tracked through the field of view of the headlight. In addition, the light control system may include some inherent latency for the processing of detected object such that the position of the object changes by the time the indicator is projected into the field of view, as discussed above. This latency adjustment to the location of the indicator may also be considered during the tracking of the object through the headlight field of view.

In operation 408, the light control system may adjust the indicator for a particular detected object in response to the tracking of the object. A similar adjustment to the indicator may be applied in response to a latency of the system. For example, due to the tracking or the latency of the response, the estimated location of a particular object within the headlight field of view may be less accurate than other detected objects. In particular, as the vehicle passes by a detected object, the object moves through the field of view at a faster rate than if the object is near the center of the field of view or moving in the same direction as the driver's vehicle. For those objects that are stationary and being passed by the vehicle, the movement of the object in the field of view is fast and the estimated or predicted location of the object in the field of view may be less accurate than other objects. In response, the indicator projected into the field of view for the object may be adjusted or change to account for the reduction in the accuracy of the predicted location. In one particular example, the diameter of a spotlight on the object may be increased as the accuracy of the object's location lowers. If the accuracy of the prediction of the location of the object (based on the object's detected location and/or the detected movement of the object), the indicator may be smaller within the field of view to indicate the location of the object. In general, the indicator may be adjusted in any manner in response to the tracking of the object as that affects the location prediction of the object by the light control system.

In one particular implementation, the indicator may be altered to indicate an increasing likelihood of an interaction with the object due to tracking the movement of the object into the path of the traveling vehicle. For example, a stationary animal on the side of the road may be projected with a first indicator. However, through tracking of the animal, the system may determine that the animal begins moving in a direction that intersects with the path of the vehicle. In response, the indicator projected for the detected animal may be adjusted to account for the movement of the animal and the increase in the probability of an interaction. In this manner, through tracking of the animal, the probability determination of an obstacle may increase and the projected indicator may be altered. Other actions may also be activated by the vehicle in response to the detected object, such as activating a braking procedure or automatic steering control of the vehicle.

Figure 5:
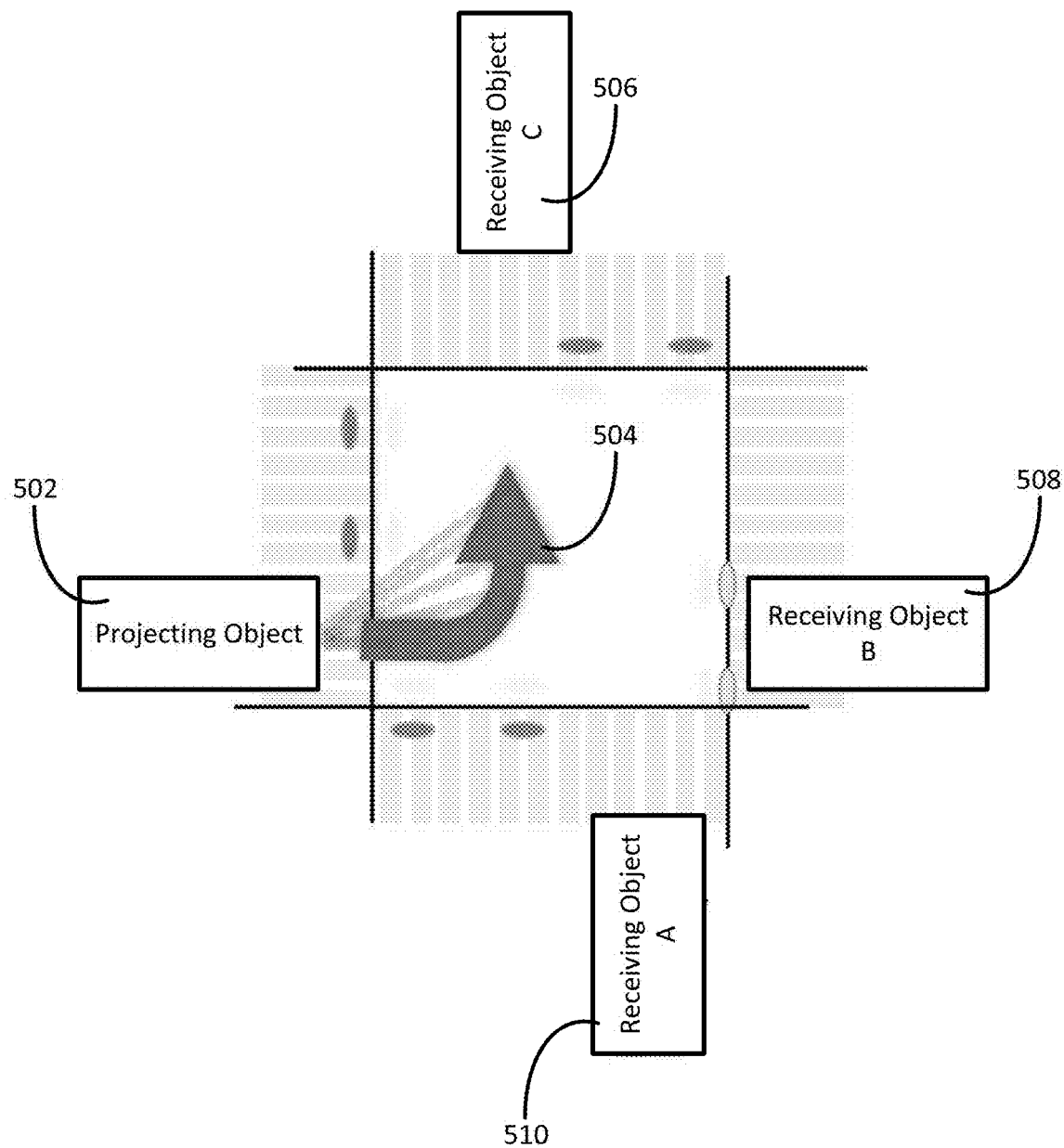
FIG. 5 is a diagram illustrating projecting an image into a field of view of a vehicle to aid a driver in operating the vehicle.

In addition to detecting objects within a field of view of a headlight or vehicle, other images may also be projected into the field of view to aid the driver in the operation of the vehicle. For example, FIG. 5 is a diagram illustrating projecting an image into a field of view of a driver of a vehicle to aid the driver in operating the vehicle. In particular, the vehicle 502 in FIG. 5 projects a turn arrow as a projected image 504 onto the pavement or road surface in front of the vehicle. This turn arrow may be visible to the driver of the vehicle 502 and/or other people within sight of the vehicle. Utilizing the same or a similar headlight system described herein, one or more projected images 504 such as the turn arrow may be projected into a field of view of a driver to aid the driver in operating the vehicle. In another implementation, the image may be projected onto a HUD visible to the driver. As described above, projecting the image onto the HUD may include determining a line of sight of the driver and projecting the image onto the HUD surface such that the image appears to be located on the road surface or other surface in front of the vehicle.

Determining the image to be projected onto the field of view of driver may be based on any scene information provided to the light control system. For example, the projected image 504 may be based on a navigation route determined from a navigation device and a geographic position of the vehicle 502 from a GPS device. In this instance, the projected image 504 may provide an indication of the next step in the navigation route, including a turn signal to indicate an upcoming turn, a straight arrow to indicate continue along current path, a distance to the next step in the navigation route, a visual countdown to the next step, and the like. In general, any navigation step or route may be projected as an image into the driver's field of view. Further, in some implementations, such images may be projected from the vehicle through projection systems incorporating spatial light modulator (SLM) technology or other adaptive optics elements.

Similarly, images may be projected onto a surface to provide information to other vehicles or people near the projected image. For example, a bright image projector, such as a laser painter may be located on the vehicle that produces a visual dynamic cue, such as a blinking, moving, or dynamically indicated arrow showing the direction of a moving vehicle or the intended direction of a stationary vehicle. The use of light projection on the road or other surface may increase the visibility of the car to other drivers and/or pedestrians as well as providing other viewers to an intended movement of the vehicle. In one example, the use of such images may indicate that the vehicle is moving into a traffic lane or pedestrian lane to those drivers or pedestrians which may not be able to see the traditional signal lights of the vehicle.

For example, the arrow 504 projected from vehicle 502 of FIG. 5 may be seen by other vehicles 506, 508, and 510. Through the projection, other drivers in the other vehicles 506-510 may be made aware of the intended path or path of travel of the projecting vehicle 502. In one example, a projected arrow may indicate the traveling path of a vehicle that may be otherwise hidden from other vehicles, such as a vehicle traveling along a row in a parking lot that may be hidden from view of other vehicles that are exiting a parking spot. As such, any information about the movement or intended movement of the vehicle 502 may be projected onto the surface, including red lights to indicate a stopping vehicle, green lights to indicate an accelerating vehicle, signals to other vehicles or pedestrians with suggested responses, the presence of a detected object in the path of one or more vehicles, and the like. The images may be projected through the use of the systems described herein. Further, the images may be projected in response scene information received from the one or more sensors and/or information from the other sources, such as a navigation path from a navigation device. The illumination of the image may be bright enough to produce a significant contrast compared to the surrounding medium, through the use of high intensity, and/or colored lights. These illumination sources include visible light laser sources which can rapidly paint shapes faster than they eye can process, or high illuminance projectors which can focus an image at various distances.

Figure 6:
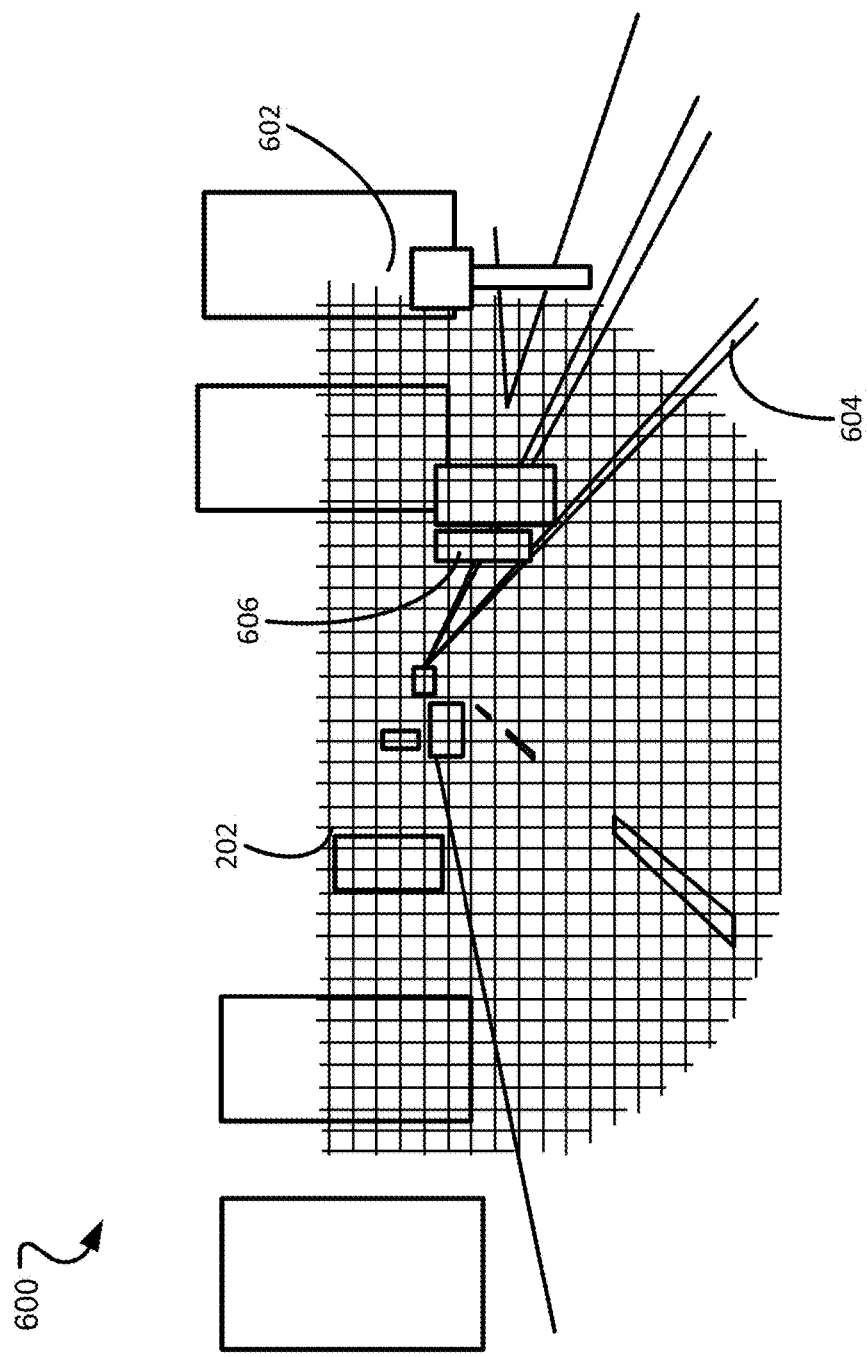
FIG. 6 is a diagram illustrating projecting an image with a contrast control feature on a plurality of portions of the field of view of the headlight.

In a similar manner as described above with reference to object detection within the field of view of a headlight, the light control system may also provide a contrast control to objects and surfaces within the scene. For example, FIG. 6 is a diagram illustrating projecting an image with contrast control on a plurality of portions of the field of view of a headlight system of a vehicle. In general, the contrast control projection from the headlight controls the illumination provided to certain objects or surfaces within the field of view of the headlight such that certain portions of the scene receive more or less illumination than other portions of the scene. As many traditional headlights provide a uniform illumination to the field of view of the headlight, a driver of a vehicle utilizing the contrast control implementation of the headlight may be able to view the scene more accurately as certain portions have more illumination than other portions.

In particular with reference to the scene 600 of FIG. 6, many detected objects or surfaces in the scene may receive less or more illumination than other objects or surfaces. For example, the reflective traffic sign 602 illustrated in the scene 600 may receive a first level of illumination. With traditional headlights, the illumination on the sign 602 may be too much such that the reflected light from the sign back to the driver makes the sign unreadable to the driver. Through the use of the contrast control feature of the light control system, less illumination may be provided on the detected sign 602 to reduce the glare reflected back to the driver such that the driver may read the traffic sign. Similarly, traditional headlights may not adequately illuminate the reflective surfaces 604 indicating the lanes on the road such that the line markers are difficult to see by the driver. This may occur especially in rainy conditions as the road surface becomes more reflective and the reflective nature of the markers 604 becomes less pronounced. In such an instance, a contrast control may be applied to illuminate the detected lane markers such that the markers receive a higher level of illumination from the headlight than other surfaces of the scene. The higher illumination level on the lane markers 604 may cause the lane markers to become more visible to the driver in comparison to traditional headlight systems. In this manner, the amount of illumination projected onto the objects and surfaces within the scene 600 may vary from surface to surface to improve the visibility of the objects and surfaces to the driver of the vehicle.

Figure 7:
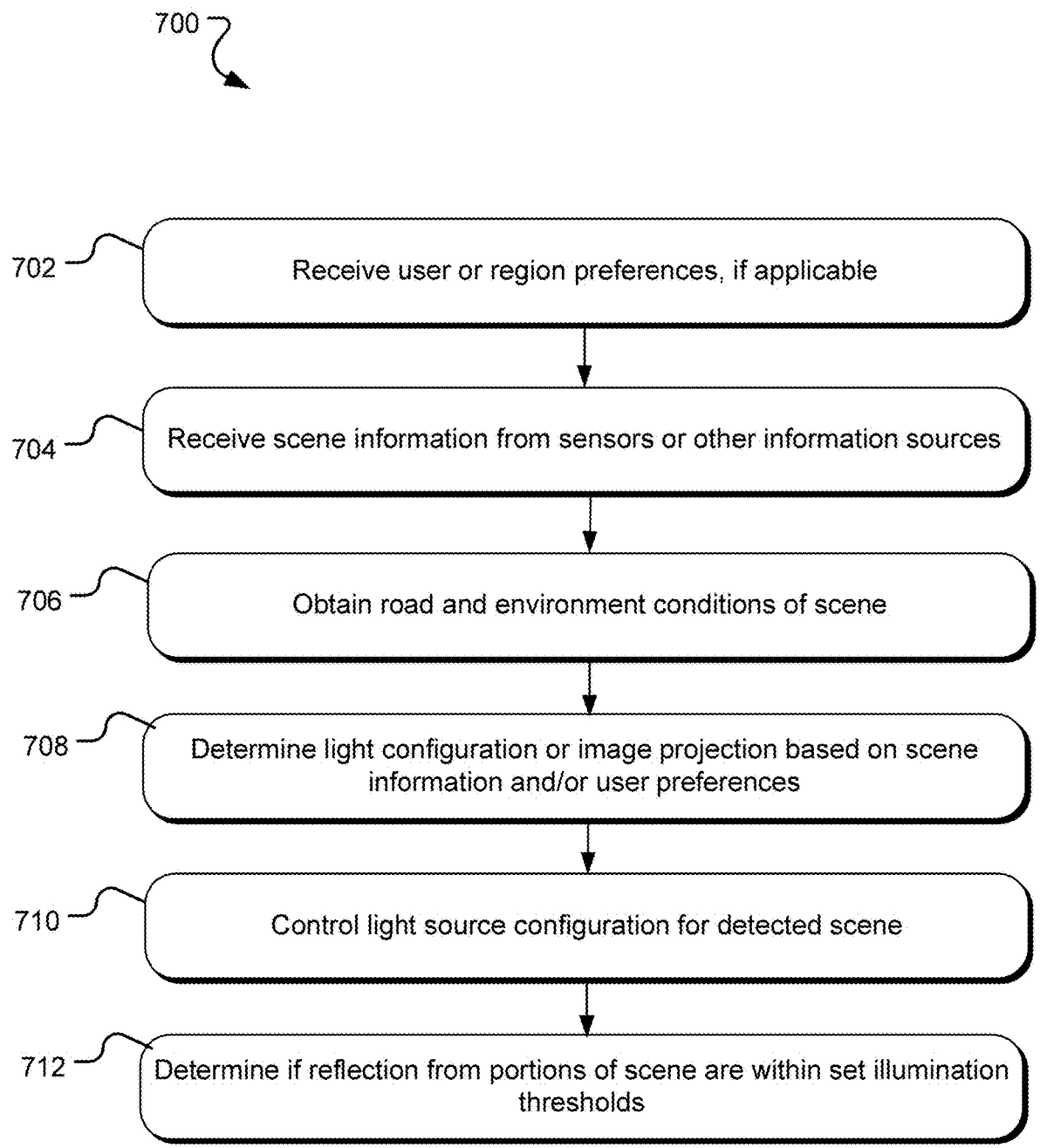
FIG. 7 is a flowchart of a method for determining a contrast control feature to apply or shine on a scene from a headlight system.

FIG. 7 is a flowchart of a method for determining a contrast control feature to apply to a scene from a headlight system. The operations of the method 700 may be performed by the light control system described herein to provide a contrast control to one or more portions of a scene in a field of view of a headlight. In general, the method 700 provides a bright and evenly illuminated scene by using information from one or more sensors and/or prior knowledge of the scene to dynamically control the field of projected illuminance to control the contrast of objects and surfaces within the observed scene.

Beginning in operation 702, the light control system may receive a user preference or region preference. For example, some drivers may prefer a higher contrast of road markers over other objects or surfaces within the scene, while other drivers may prefer an even illumination across the entire field of view. Such preferences may be provided by the user of the light control system through an input to the system. In another example, it a visual preference for lighting a scene while driving may be based on the geographic region of the vehicle. For example, it may be observed that drivers in Europe generally prefer a particular illumination of the scene that differs from the typical preference of a United States driver. Thus, the control light system may receive a region in which the vehicle is located and apply a stored illumination preference, accordingly.

In operation 704, the light control system receives information of the scene from one or more sensors and/or from other information sources. In general, the scene information includes presence information and location of objects and surfaces within a field of view of a headlight or vehicle as described above. Also similar to above, any type of sensor that obtains information of the presence, condition, type and/or location of an object or surface may be utilized to gather scene information and provide such information to the light control system. Such sensors may include image sensors across the electromagnetic spectrum (including infra-red or near infra-red cameras), distance mapping sensors (such as LIDAR, RADAR, stereo imaging, structured light sensors), and/or non-imaging photodetectors. In addition to scene information obtained from one or more sensors, other information sources may also be utilized to determine objects and conditions of a field of view of a headlight. For example, the geographic location of the vehicle or light system and prior knowledge or information of the known location may be obtained.

In operation 706, the conditions of the road, other surfaces, or the general environment in the field of view of the headlight may also be obtained from the one or more sensors or other information sources. In general, any information that may be used to determine the location, condition, and reflectiveness of surfaces and objects within the headlight field of view may be utilized to determine a contrast control function to apply to an illumination of the field. For example, a sensor may determine a condition of the surface of a road in front of the vehicle, whether the road is dry, wet, icy, oily, etc. by providing a light source onto the road surface and sensing the reflected signal. Another sensor may detect the reflectiveness of one or more surfaces within the field of view, such as a reflective traffic sign, reflective strips located on the road surface, and/or reflective clothing on a pedestrian or biker.

With the scene information and/or user preferences received, the light control system may determine a configuration of one or more light sources in operation 708. In general, the light configuration is determined in response to the received scene information. In the implementation where the light source is an array of lights, the light configuration may include controlling the illumination of one or more of the array of lights, including an intensity of illumination and/or a color of light from the one or more of the array of lights. In the implementation where the light source is a light projector or laser projector, the configuration may include an image to be projected and an estimated location in the field of view of the headlight on which the image is projected. In this manner, the light control system determines what is to be projected into the field of view of the headlight and the location of the projection. In operation 710, the light control system applies the light configuration to the light source, such as the headlight light source of the vehicle, in response to the scene information received.

In particular, the scene information received from the one or more sensors and other information sources may provide a general reflectiveness of the surfaces and objects within the field of view of the headlight. In one example, an infra-red (IR) or near infra-red camera light and camera system may be utilized. The light source provides an illumination on the field of view of the headlight and the camera measures a received reflection of the scene. From the received reflection, the light control system may determine a general reflectiveness of the objects and surfaces in the scene. In response to the received reflectiveness of the objects and surfaces in the scene, a light configuration including contrast control over the field of view may be generated. In particular, each object or surface of the scene may have a particular reflectiveness as received by the IR or near-IR camera. If a particular object or surface has a reflectiveness that exceeds a particular upper threshold level, the light control system may respond by dimming an illumination on the particular object or surface from the headlight. Conversely, if the measured reflectiveness is below a particular lower threshold level, the light control system may respond by increasing the illumination on the particular object or surface. Further, the dimming and increasing of illumination of an object or surface may be dependent on the preferences provided to the system. For example, each received reflectiveness measurement may be adjusted through the contrast control to provide an even distribution of illumination across the field of view of the headlight. In another example, the contrast control of the field of illumination may be controlled in response to one or more preferences supplied to the light control system, such as providing a greater illumination on the reflective surfaces or markers on the road surface. In this or a similar manner, the contrast control of the field of view of the headlight may be determined from a received measurement of the reflectiveness of the objects and surfaces within the field of view and/or one or more preferences provided to the system.

It should be appreciated that the contrast control system may not only increase the visibility of the scene to a driver of the vehicle, but may also increase the visibility of the scene for computer vision applications. For example, autonomous vehicle controls may capture an image of the scene in front of vehicle to aid in controlling the autonomous vehicle. Thus, the contrast control system may improve the image capture of the scene by the autonomous vehicle control system to improve the operation of the vehicle.

In one implementation, the light control system may determine a type of object or surface detected in the field of view of the headlight. For example, a user preference may indicate that the user prefers the lane markers or other reflective surfaces within the field of view to be illuminated more than other surfaces. In this example, the light control system determines which surfaces in the field of view of the headlight are highly reflective that may indicate the surface is a reflective surface. Such surfaces may have the highest level of reflectiveness when an IR or near-IR light is flashed upon the scene and the reflected light is measured. In response, the control light system provides more illumination on the surfaces that are detected as reflective. Similarly, the contrast control feature may not provide high illumination on detected pedestrians and/or animals to prevent the pedestrian from being startled by the vehicle. In this example, the system may determine the type of object in a scene as a living object and adjust the contrast control accordingly. Thus, the light control system may not only determine a reflectiveness of surfaces and objects in the scene, but may also classify the surfaces and objects and apply certain contrast control illumination on the classified objects and surfaces.

Although the light control system may determine a type of object or surface within a field of view of the headlight, such classification may not be necessary. For example, one contrast control setting of the system may attempt to keep an even distribution of illumination across the scene. In this example, the light control system may not determine the type of surfaces or objects in detected scene but rather determines the reflectiveness of each surface and object. The contrast control applied by the system in such an example determines the amount of illumination on the surfaces and objects without determining the type of object or surfaces in the scene.

Alternatively, an image processing may be used to identify regions in the field where there are edges (gradients) which may then direct the lighting system to preferentially illuminate or dim these regions relative to regions where there are not edges. In one embodiment, an edge in the scene is detected at a location in the illuminated scene that transitions from a high reflection to a low reflection. For example, if a reflection surface is included in the scene, the boundary between the high reflectiveness of the surface of the sign and the low reflectiveness of the area outside the sign may be detected as an "edge" within the scene by the system. Because the human visual system is sensitive to such gradients, highlighting gradients will have an interesting visual perception effect and may also be used to enhance attention. In another alternative, image processing may be used to identify similar regions of color and the lighting system may respond by illuminating the color regions with the same color to make a more color saturated visual experience, or they can mute the color by increasing the illumination on the grey regions, and shining the complimentary color of light onto the surface to desaturate the natural color. In yet another alternative, texture analysis may be applied to the images to identify various possible image characteristics (patterns, shapes, etc.) and the lighting system directed to respond accordingly (project a pattern or counter pattern, project the shape or color onto the shape, etc.)

Similar to the object detection described above, the contrast control feature of the light control system may also track objects or surfaces through the field of view of the headlight as the vehicle and/or detected objects move. Tracking of objects or surfaces provide a more accurate application of the contrast control onto the scene from the headlight. Similarly, the light control system may determine a latency of the system for more accurate application of the contrast control feature. In particular, the system may determine an estimated or predicted location of a surface or object within the scene based on the processing latency of the system between detection of the object or surface and the projection of the contrast control on the scene. By predicting the location of the object or surface in the scene, a more accurate projection of the contrast control illumination on the scene may be achieved, as described above.

Figure 8:
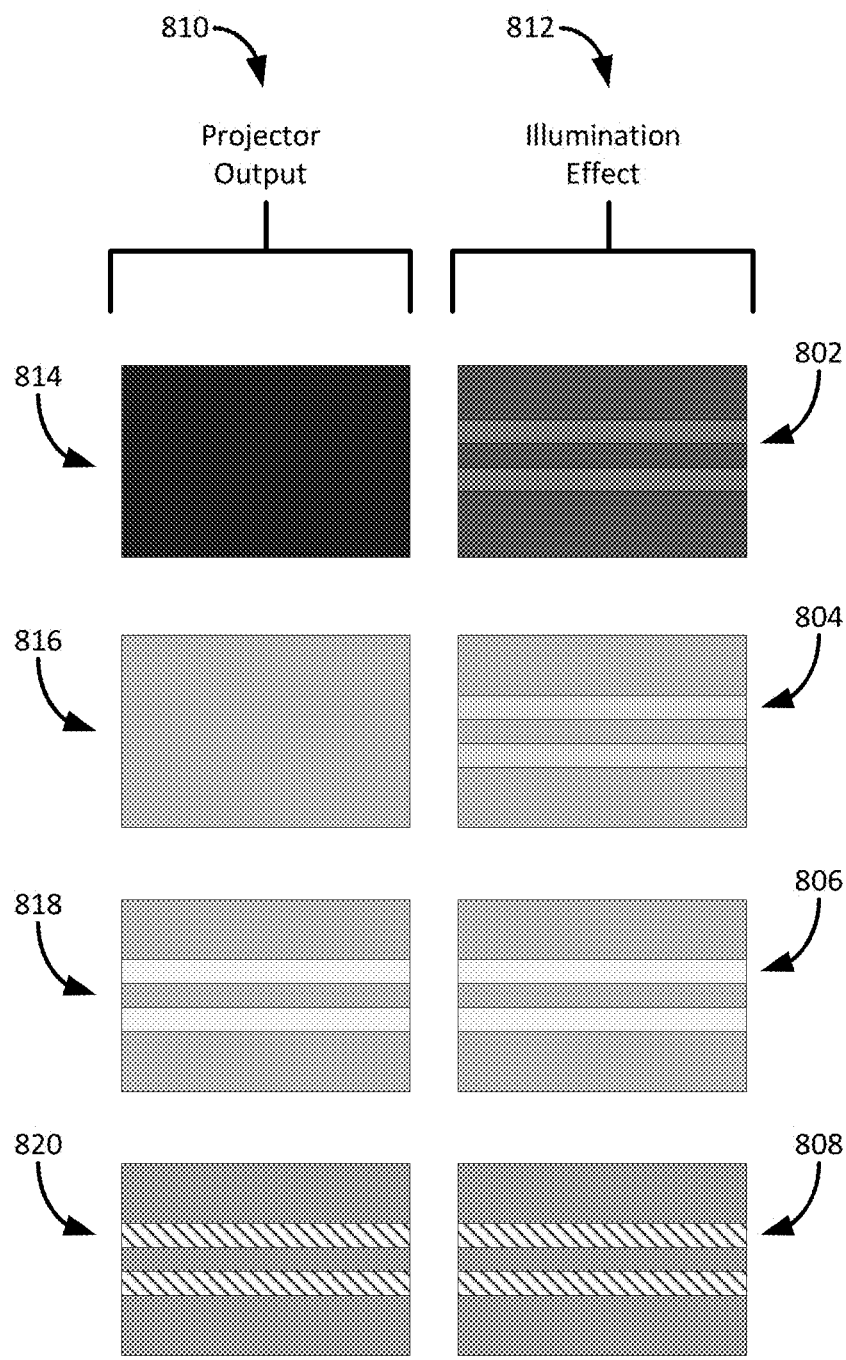
FIG. 8 is a diagram illustrating projecting homogenous illumination and a color image on a surface to enhance the visibility of lane markers on a road surface.

In addition to providing more or less illumination to a scene as part of a contrast control feature, the light system may also project images and/or colors to enhance the visibility of surfaces or objects in the scene. For example, FIG. 8 is a diagram illustrating projecting homogenous illumination and/or a color image on a surface to enhance the visibility of lane markers on a road surface. The Figure illustrates the difference in visibility of lane markers and surfaces from different projector outputs 810 applied to the lane markers. In particular, results 812 are illustrated for no illumination 814 applied to the scene 802, for a homogeneous illumination 816 applied to the scene 804, for a greyscale contrast control image 818 projected on the scene 806, and for a color (illustrated as a hashmark) contrast control image 820 projected on the scene 808. As shown, providing a homogenous illumination 816 (such as lighting a scene using a traditional headlight) may improve the visibility of the surface of the scene 804 over no illumination 814, as shown in scene 804 when compared with scene 802. Further, providing a greyscale contrast control image 818 to the scene with lane markers provides an even higher visibility to the scene 806, in a similar manner as described above. In general, a greyscale contrast control image 818 includes illuminating the portions of the scene 806 that does not include the lane markers with a first greyscale light and illuminating the lane markers of the scene 806 with a second (potentially lighter) greyscale light. The application of a lighter greyscale illumination on the lane markers causes the lane markers to appear more visible to an observer than the darker portions of the scene. In other words, the application of the two greyscale lights with differing darkness allows the lane markers (or other lighter surfaces within the scene 806) to become easier to distinguish from the dark surface upon which the lane markers are located. However, application of a greyscale contrast control image 818 to the scene 806 may not account for inconsistencies in the lane markers as the inconsistencies are illuminated with the same intensity as the reflective portions of the markers. For example, portions of the lane markers may be missing do to wear on the lane markers over time. Such missing portions may not include a reflective surface or may not be the same color as the rest of the lane marker.

In one embodiment, inconsistencies in lane markers of a scene may be "filled in" or otherwise accounted for by projecting a color image 820 onto the scene 808 (including the lane markers) to provide a visually consistent lane marker. For example, a color image 820 that includes yellow stripes (indicated by the hashmarks of the color image 820) may be projected onto yellow colored lane markers on the road. In a similar manner, a color image 820 that includes white stripes may be projected onto white colored lane markers on the road scene 808. Through the projection of the color image 820, the lane markers within the scene 808 may appear to the driver of the vehicle as being a solid stripe or may otherwise account for wear on the lane markers. In other words, by projecting a color image onto one or more surfaces or objects in the scene, one or more inconsistencies in the surface or objects in the scene may be accounted for to provide a more consistent view to the driver of the vehicle. In general, any color image may be projected onto the scene from the light control system to provide more visibility to surfaces or objects within the scene over simple illumination of portions of the scene.

Figure 9:
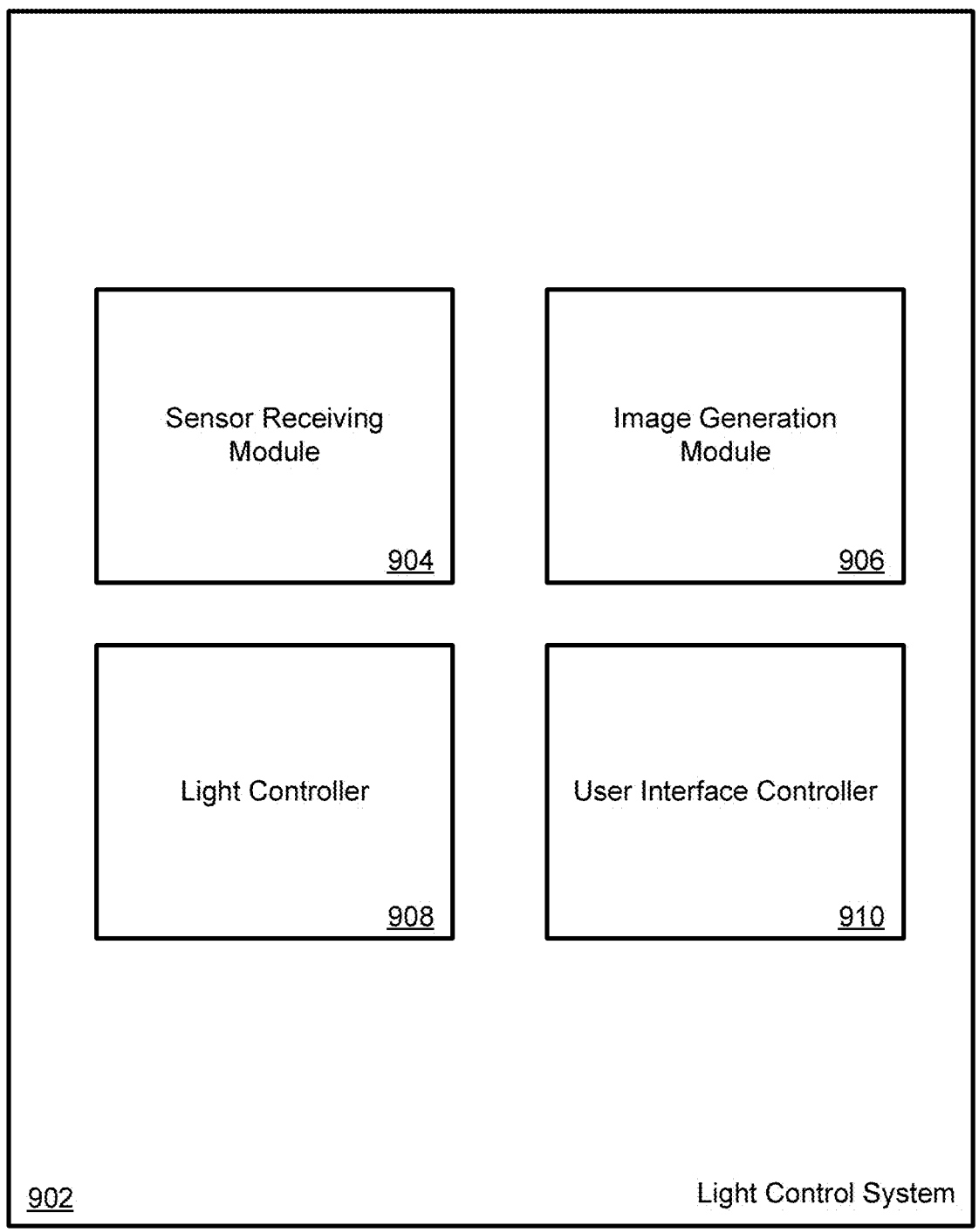
FIG. 9 is a schematic diagram illustrating an exemplary light control system.

FIG. 9 is a schematic diagram illustrating an exemplary light control system. The illustrated light control system 902 may be utilized to perform any of the operations and features described herein. In general, the light control system 902 includes several components or modules, including (but not limited to), a sensor receiving component 904, an image generation component 906, a light controller component 908, and a user interface controller 910. Additional or fewer components may be included in the light control system 902. Further, the components of the light control system 902 may be included in a single device or may be housed in any number of devices. The operations of each of the components of the light control system 902 may be performed through a series of software instructions, hardware components or a combination of both software and hardware. The general operations of each component of the light control system 902 are described in more detail above.

In general, the sensor receiving module or component 904 receives scene information from one or more sensors. In addition, the sensor receiving module 904 may receive scene information from other information sources, such as a GPS device providing location information to the control system 902. The image generation module or component 906 generates an image or illumination mask in response to the scene information received from the sensors and/or other information sources, as described above. When the illumination image is generated, the light controller 908 provides the instructions to the illumination device for projecting the generated mask onto the scene. In addition, the user interface controller 910 may receive information from a user indicating the user's preferences and/or other instructions provided to the light control system 902 to determine the image generated and projected by the system.

Figure 10:
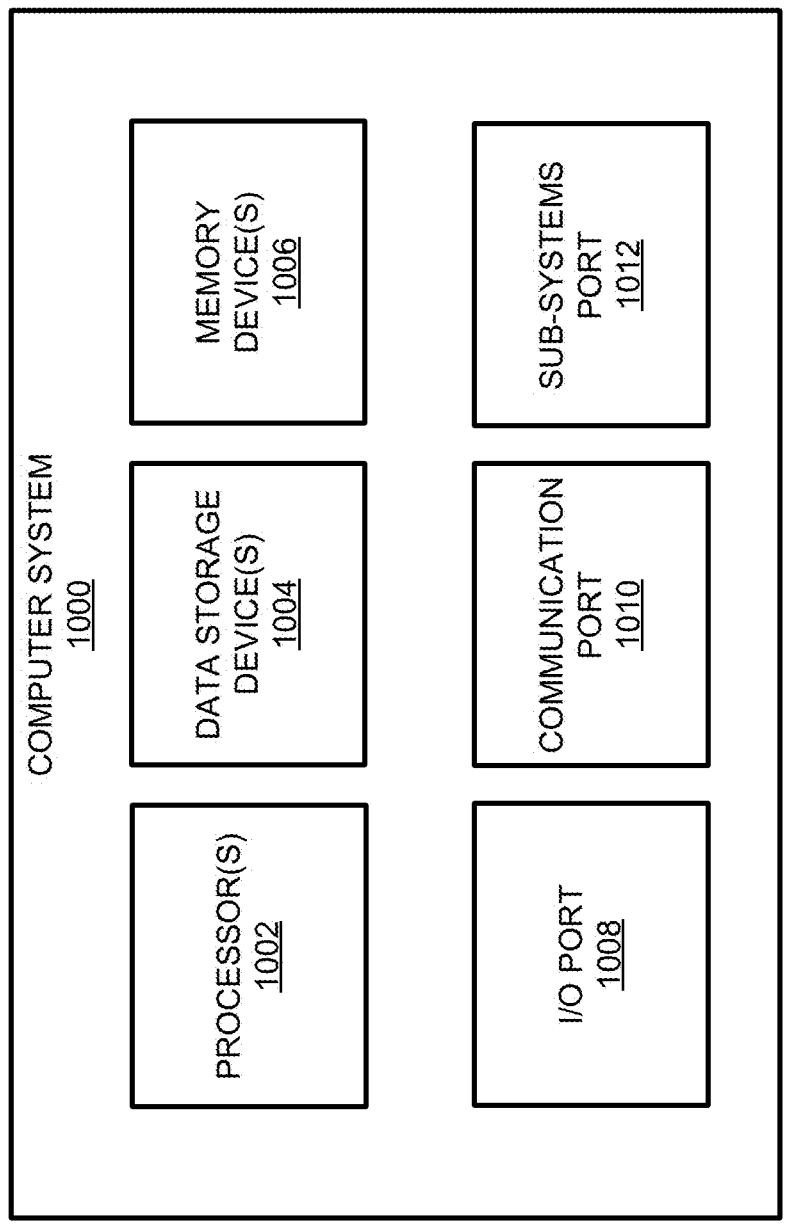
FIG. 10 is a diagram illustrating an example of a computing system which may be used in implementing embodiments of the present disclosure.

Referring now to FIG. 10, a detailed description of an example computing system 1000 having one or more computing units that may implement various systems and methods discussed herein is provided. The computing system 1000 may be applicable to the lighting system and other devices discussed herein. It will be appreciated that specific implementations of these devices may be of differing possible specific computing architectures not all of which are specifically discussed herein but will be understood by those of ordinary skill in the art.

The computer system 1000 may be a computing system capable of executing a computer program product to execute a computer process. Data and program files may be input to the computer system 1000, which reads the files and executes the programs therein. Some of the elements of the computer system 1000 are shown in FIG. 10, including one or more hardware processors 1002, one or more data storage devices 1004, one or more memory devices 1006, and/or one or more ports 1008-1012. Additionally, other elements that will be recognized by those skilled in the art may be included in the computing system 1000 but are not explicitly depicted in FIG. 10 or discussed further herein. Various elements of the computer system 1000 may communicate with one another by way of one or more communication buses, point-to-point communication paths, or other communication means not explicitly depicted in FIG. 10.

The processor 1002 may include, for example, a central processing unit (CPU), a microprocessor, a microcontroller, a digital signal processor (DSP), and/or one or more internal levels of cache. There may be one or more processors 1002, such that the processor 1002 comprises a single central-processing unit, or a plurality of processing units capable of executing instructions and performing operations in parallel with each other, commonly referred to as a parallel processing environment.

The computer system 1000 may be a conventional computer, a distributed computer, or any other type of computer, such as one or more external computers made available via a cloud computing architecture. The presently described technology is optionally implemented in software stored on the data stored device(s) 1004, stored on the memory device(s) 1006, and/or communicated via one or more of the ports 1008-1012, thereby transforming the computer system 1000 in FIG. 10 to a special purpose machine for implementing the operations described herein. Examples of the computer system 1000 include personal computers, terminals, workstations, mobile phones, tablets, laptops, personal computers, multimedia consoles, gaming consoles, set top boxes, and the like.

The one or more data storage devices 1004 may include any non-volatile data storage device capable of storing data generated or employed within the computing system 1000, such as computer executable instructions for performing a computer process, which may include instructions of both application programs and an operating system (OS) that manages the various components of the computing system 1000. The data storage devices 1004 may include, without limitation, magnetic disk drives, optical disk drives, solid state drives (SSDs), flash drives, and the like. The data storage devices 1004 may include removable data storage media, non-removable data storage media, and/or external storage devices made available via wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 1006 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in the data storage devices 1004 and/or the memory devices 1006, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

In some implementations, the computer system 1000 includes one or more ports, such as an input/output (I/O) port 1008, a communication port 1010, and a sub-systems port 1012, for communicating with other computing, network, or vehicle devices. It will be appreciated that the ports 1008-1012 may be combined or separate and that more or fewer ports may be included in the computer system 1000.

The I/O port 1008 may be connected to an I/O device, or other device, by which information is input to or output from the computing system 1000. Such I/O devices may include, without limitation, one or more input devices, output devices, and/or environment transducer devices.

In one implementation, the input devices convert a human-generated signal, such as, human voice, physical movement, physical touch or pressure, and/or the like, into electrical signals as input data into the computing system 1000 via the I/O port 1008. Similarly, the output devices may convert electrical signals received from computing system 1000 via the I/O port 1008 into signals that may be sensed as output by a human, such as sound, light, and/or touch. The input device may be an alphanumeric input device, including alphanumeric and other keys for communicating information and/or command selections to the processor 1002 via the I/O port 1008. The input device may be another type of user input device including, but not limited to: direction and selection control devices, such as a mouse, a trackball, cursor direction keys, a joystick, and/or a wheel; one or more sensors, such as a camera, a microphone, a positional sensor, an orientation sensor, a gravitational sensor, an inertial sensor, and/or an accelerometer; and/or a touch-sensitive display screen ("touchscreen"). The output devices may include, without limitation, a display, a touchscreen, a speaker, a tactile and/or haptic output device, and/or the like. In some implementations, the input device and the output device may be the same device, for example, in the case of a touchscreen.

In one implementation, a communication port 1010 is connected to a network by way of which the computer system 1000 may receive network data useful in executing the methods and systems set out herein as well as transmitting information and network configuration changes determined thereby. Stated differently, the communication port 1010 connects the computer system 1000 to one or more communication interface devices configured to transmit and/or receive information between the computing system 1000 and other devices by way of one or more wired or wireless communication networks or connections. Examples of such networks or connections include, without limitation, Universal Serial Bus (USB), Ethernet, Wi-Fi, Bluetooth®, Near Field Communication (NFC), Long-Term Evolution (LTE), and so on. One or more such communication interface devices may be utilized via the communication port 1010 to communicate one or more other machines, either directly over a point-to-point communication path, over a wide area network (WAN) (e.g., the Internet), over a local area network (LAN), over a cellular (e.g., third generation (3G) or fourth generation (4G)) network, or over another communication means. Further, the communication port 1010 may communicate with an antenna for electromagnetic signal transmission and/or reception. In some examples, an antenna may be employed to receive Global Positioning System (GPS) data to facilitate determination of a location of a machine, vehicle, or another device.

The computer system 1000 may include a sub-systems port 1012 for communicating with one or more systems related to a vehicle to control an operation of the vehicle and/or exchange information between the computer system 1000 and one or more sub-systems of the vehicle. Examples of such sub-systems of a vehicle include, without limitation, imaging systems, motor controllers and systems, battery control, fuel cell or other energy storage systems or controls in the case of such vehicles with hybrid or electric motor systems, autonomous or semi-autonomous processors and controllers, steering systems, brake systems, light systems, navigation systems, environment controls, entertainment systems, and the like.

The methods and effects discussed herein may be utilized in use with any type of headlight or other illumination system of a vehicle. As discussed above, typical headlight structures include a light source and one or more reflector surfaces to create a beam of light projected onto the scene. Headlight light sources often include halogen bulbs or other types of light bulbs, an array of light emitting diodes (LEDs), laser lights, and the like. More advanced headlights may include systems to control the projected light beam, including leveling systems, beam switching systems to switch from a first light source to a second light source, and adaptive headlights that orient the beam based on a change of direction of the vehicle.

However, light systems that require the projection of focused images at more than one distance or on multiple surfaces at various angles present challenges to conventional projector systems, as their depth of field is defined around a single plane of focus. Thus, headlight systems based on conventional projector systems are limited in the area which they can projected in-focus images. As a result, the projected image may appear out of focus on many of the surfaces of the scene, reducing the effectiveness of the projected image in aiding the vehicle or driver in visualizing the scene. In addition, if the projected image is provided onto two surfaces that are separated by a distance from the headlight, the image may be focused on one of the surfaces but out of focus on the other. Thus, a projection system that expands the depth of field of focus to increase the area in which in focused images can be projected onto the forward road scene are provided herein to improve the visibility of projected images from a light system. In general, the light field projection techniques described herein enable a headlight system to project image information over a complex surface with variable standoff distances.

Figure 11:
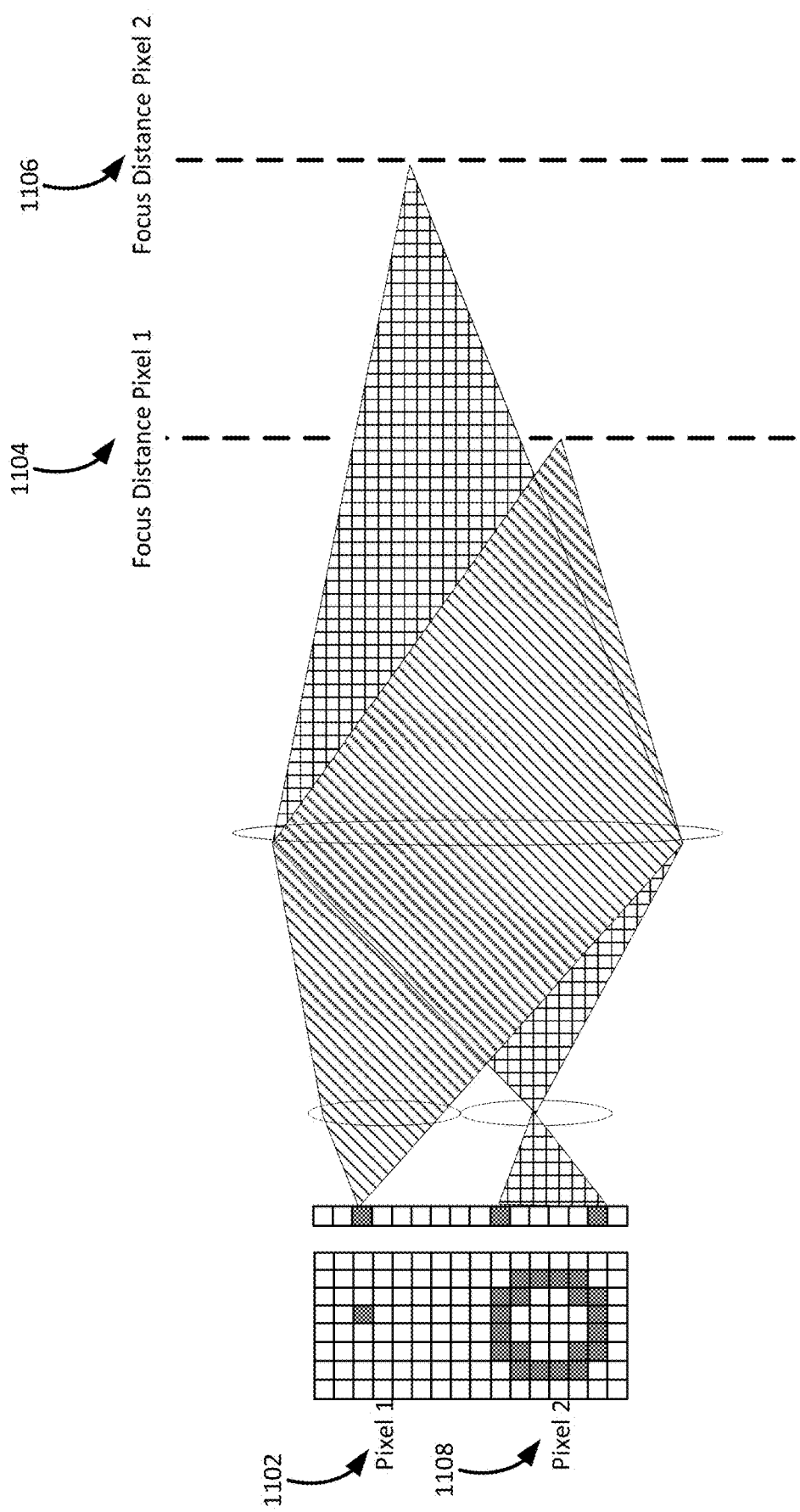
FIG. 11 is a diagram illustrating a first approach for a dynamic volumetric headlight utilizing light field imaging.

FIG. 11 is a diagram illustrating a first approach for a dynamic volumetric headlight utilizing light field imaging. Generally, a standard projection system involves the creation of a bright image in a focal plane which is projected into a scene. In the case of digital projectors, one pixel in the created image corresponds to one region in the projected image plane. Light field projection systems, such as that illustrated in FIG. 11, involve a variation on this principal in that the object image involves the creation of a pattern which mimics the image conjugated to a particular standoff distance. For example, a single point that would be at the nominal focus of the optical system could be projected as a point at a different distance by creating an extend spot, or ringlike shape of intensity. As shown in FIG. 11, Pixel 1 1102 is projected through the lenses of the system to a first focus distance 1104. To create a similar pixel representation at a second focus distance 1104, a ringlike shape 1108 is created to represent Pixel 2. When projected through the lenses of the system, the ringlike pixel 1108 appears as an in-focus pixel at focus distance 2 1106. In this manner, the pixels may be represented in focus at different focus distances from the projected image.

In this system, individual pixels may thus be defined by a microlens array. As such, this system utilizes the control of a number of light emitting pixels per image projected pixel, with a ratio depending on the resolution and depth of field required. Such a system is capable of projecting images with a field dependent focus. However, to determine the distance to the intended focus plane from the projector, scene information may be provided to the light control system as described above. In particular, a distance map of the surface which is intended for image projection may be obtained from one or more sensors or other information sources that provides three-dimensional standoff distance information from the headlight. One such sensor includes the LIDAR sensor described above.

Figure 12:
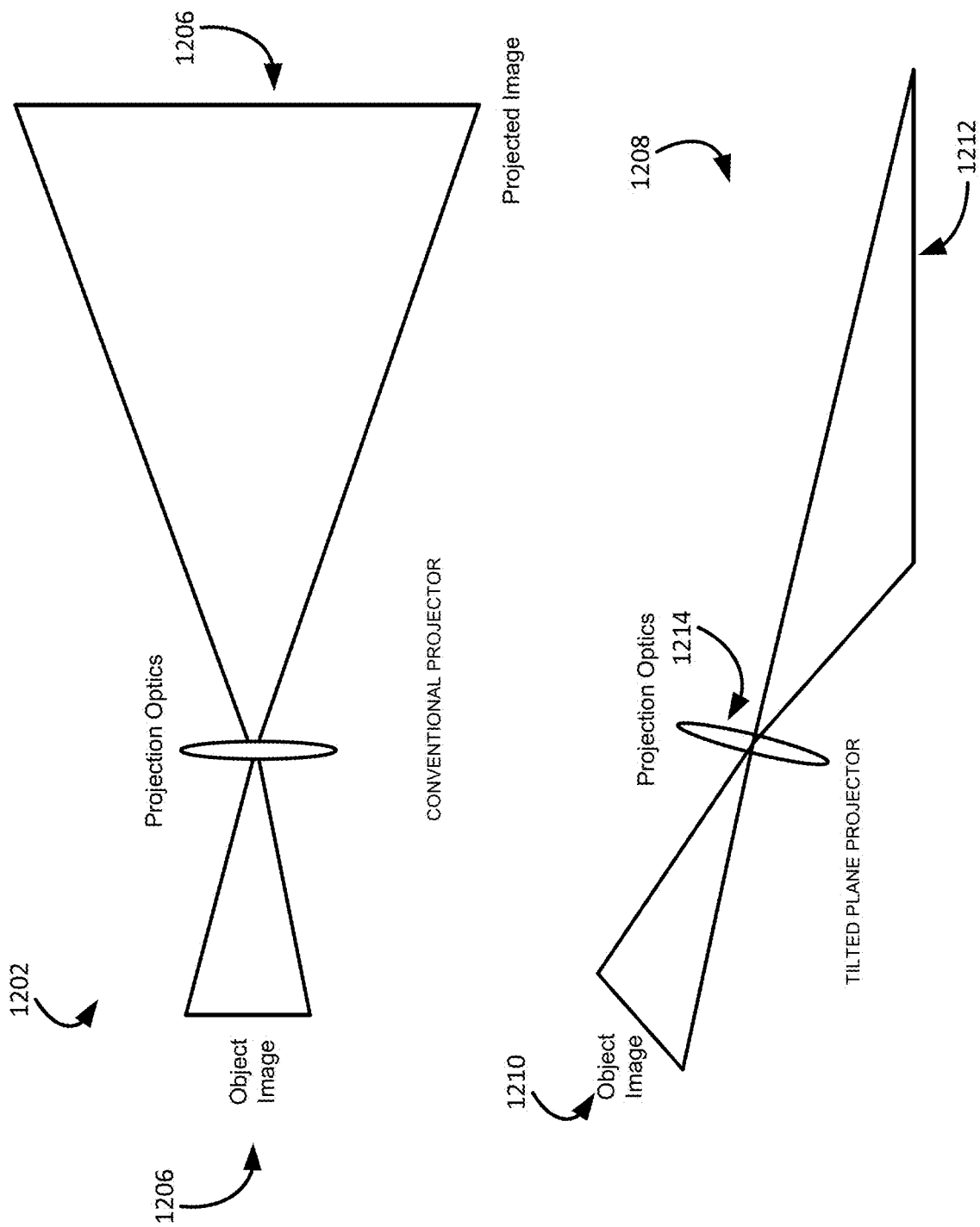
FIG. 12 is a diagram illustrating a second approach for a dynamic volumetric headlight utilizing a titled focal plane.

Although possible to provide a dynamic volumetric headlight, the control of the light emitting pixels as described in the system of FIG. 11 over a large projection field may be processing intensive. An alternate approach for providing a dynamic volumetric headlight system is illustrated in FIG. 12. As shown in FIG. 12, conventional projector systems 1202 are designed to project an image 1206 on a flat screen or surface 1204 from a position very close to this surface. This creates a condition where the intended projected image plane 1204 occupies a range distances from the projector exit aperture. If a traditional object image plane is used that is perpendicular to the optical axis, that system would only be able to project a focused image at a fixed distance from the aperture. However, such a system would not be accommodating in a headlight system of a vehicle as the system limits the ability to project focused images on the pavement surface which occupies a range of standoff distances from the headlight.

Thus, in order to accommodate the environment of a headlight of a vehicle, a short throw projecting system 1208 may be utilized that tilts the object image plane 1210 that is projected relative to the projection optics 1214, which tilts the projected image plane accordingly 1212. Through the use of a tilted focal plane, an image may be projected onto a road surface from a headlight that maintains the focus of the image through the standoff distance from the headlight. In particular, such headlight applications using a tilted object image plane relative to the projection optics may define the image plane 1212 to be the nominal pavement surface relative to the headlight position. Although the projected image in this implementation is limited to one plane 1212, this plane can be defined as the plane of the flat road surface. This will allow the projection of focused images onto the pavement surfaces. Although tilted focal planes techniques offer improvements over traditional projector systems, such titled focal plane systems may have limited capabilities of projecting focused images off the pavement surface, for example on a wall which is perpendicular to the road surface.

Another method of extending the depth of field of projection from a headlight is through use of a direct scan laser projector. In general, direct scan laser devices form an image by reflecting laser beams off of a fast tip-tilt Micro-Electro-Mechanical System (MEMS) mirror which can scan through the angular area of an image faster than a human can perceive the motion. These systems have a large depth of field because they are generally constructed from compact diameter collimated laser beams. Contrast of intensity and color in the image can be made by a variety of ways, either by controlling the time spent at a particular angle through the scan mirror slew rate, or by varying the brightness of the laser synchronized to the angular displacement. Generally, such direct scan laser projector systems utilize low power lasers to make total output of less than 100 lumens. Such power is typically inadequate for vehicle headlights. Low power lasers are generally used to limit the thermal management issues from higher power lasers. However, beyond thermal management, higher power systems which could produce 2000 lm output or more for headlights may be incorporated into headlight systems.

Figure 13:
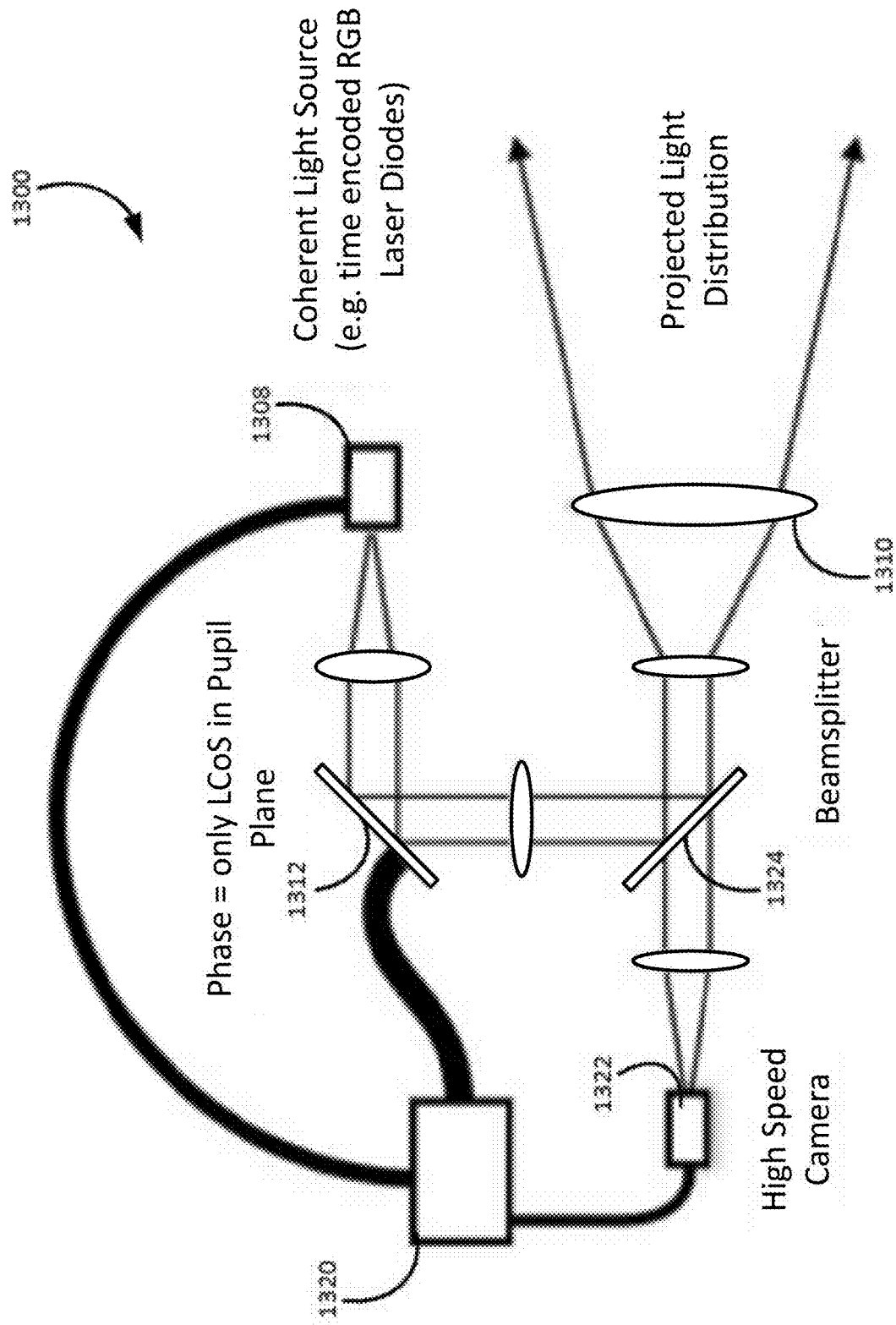
FIG. 13 is a diagram illustrating a third approach for a dynamic volumetric headlight utilizing wavefront phase manipulation

FIG. 13 is yet another implementation of a dynamic volumetric headlight system utilizing wavefront phase manipulation. The system 1300 illustrated in FIG. 13 is one example of a phase modulator system that may be used in conjunction with headlight of a vehicle, although other phase modulator systems are contemplated. Through the use of the headlight system 1300 of FIG. 13, a dynamic volumetric headlight with a large field of focus that enables the headlight to project image information over a complex surface with variable standoff distances while maintaining focus of the image.

The system 1300 of FIG. 13 includes at least one light source 1308 and an aperture 1310. The light source 1308 may be a single source having a broadband emission of electromagnetic radiation (e.g., a halogen lamp) or a collection of multiple sources (e.g., an LED array). The collection of multiple sources may have individual elements dedicated to a specific band of emission. For example, and without limitation, the collection of multiple sources may be an LED array having individual elements dedicated to red emissions, green emissions, and blue emissions (i.e., RGB). Other configurations for the collection of multiple sources are possible. The aperture 1310 may contain one or more optical elements to assist in directing light along the axis of projection 1306. Non-limiting examples of optical elements include shutters, lenses, prisms, mirrors, filters, collimators, light pipes, beam splitters, and diffraction gratings. Other optical elements, however, are possible. In FIG. 13, the aperture 1310 is depicted as including a lens. However, this depiction is for purposes of illustration only. Those skilled in the art will recognize that other optical elements, and their corresponding combinations, are possible yet remain within the scope of the present disclosure.

In some embodiments, the system 1300 includes a displaceable optical element 1312 selected from the group consisting of a lens, a mirror, and a prism. In such embodiments, a motion of the displaceable element includes a vertical shift, a horizontal shift, a tilt (i.e., rotation about a horizontal axis), a swing (i.e., rotation about a vertical axis), or combinations thereof. For example, and without limitation, the displaceable optical element 1312 could include a shift lens, a tilt/tip mirror, and a rotatable prism. Other displaceable elements are possible. The displaceable optical element 1312 is operable to assist in changing a direction, or orientation, of the axis of projection. In some particular embodiments, the displaceable optical element 1312 includes a liquid crystal on silicon (LCoS) device configured to alter an orientation of the axis of projection. The altered beam pattern then enables an illumination profile that is projected onto the scene from the headlight system 1300.

The system 1300 additionally includes a control unit 1320 in communication with the at least one illumination unit 1308. The control unit 1320 is configured to change the illumination profile projected onto the scene in cooperation with the spatial light modulator 1312, the light source 1308, and in certain embodiments, the aperture 1310. Such change may occur dynamically and in real-time based on feedback the system 1300. In one embodiment, the control unit 1320 may be in communication with the liquid crystal on silicon (LCoS) device 1312.

In some embodiments, the system 1300 includes at least one camera unit 1322 in communication with the control unit 1320. The at least one camera unit 1322 is configured to capture one or more images of the scene, which typically includes interaction of the illumination profile with the scene. In FIG. 13, the at least one camera unit 1322 shares a common aperture (i.e., 1310) with the at least one illumination unit 1308. This configuration is aided by a beam splitter 1324 that directs a portion of light received through the aperture 1310 from the scene towards the at least one camera unit 1322. However, other configurations of the at least one camera unit 1322 are possible. For example, and without limitation, the at least one camera unit 1322 may be a unit external to the illumination unit.

The at least one camera unit 1322 is operable to generate data signals representing the one or more images of the scene 1302 and send such data signals to the control unit 1320. Thus, the at least one camera unit 1322 effectively transmits the one or more images to the control unit 1320. In embodiments having the at least one camera unit 1322, the control unit 1320 is further configured to receive data signals from the at least one camera unit 1322 and use such data signals in combination with signals to generate control signals. In these embodiments, the control unit 1320 may include one or more processors and one or more memories to process software algorithms that analyze the one or more images captured by the at least one camera unit 1322, such as described above.

Through the headlight system 1300 of FIG. 13, manipulation of the phase across a coherent wavefront may enable the projection of images which have a large depth of field. In other words, through the manipulation of the phase of the wavefront, the headlight system 1330 may project image information over a complex surface with variable standoff distances. However, other methods of phase manipulation besides phase only liquid crystal devices may also be utilized to achieve the same or similar depth of field, such as a high order deformable mirror. In general, any system that manipulates the phase of the coherent or semi-coherent wavefront may be utilized as described herein.

As mentioned above, the headlight system may incorporate a camera 1322 to capture one or more images of the scene, which typically includes interaction of the illumination profile with the scene. In some implementations, the camera unit 1322 shares a common aperture (i.e., 1310) with the at least one illumination unit. As such, the camera may collect images of the scene as illuminated by the headlight. One an additional implementation, the camera 1322 may be utilized by the light control system to gather scene information and store the information for later use by the system. For example, the camera 1322 may be one of the other sources of information discussed above that provides scene information based on a location of the headlight or the vehicle.

In particular, autonomous navigation and driver assistance systems are limited by the accuracy to which the six-axis location and orientation of the vehicle can be estimated relative to a reference map of the road. Relying primarily on GPS for this task has proved inadequate in previous implementations due to variable signal quality intrinsic to the technology. Discussed herein is an implementation of the light control system that incorporates an actively illuminated computer vision system to obtain an efficient localization signal to both create robust and accurate reference maps, which enable fast, high performance real-time localization calculations to augment or replace other location sensors. In one particular implementation of the light control system, one or more common aperture camera/illumination systems (such as that illustrated in FIG. 13) are mounted at known locations and orientation on a vehicle, such as being incorporated into a vehicle headlight system to obtain an efficient localization signal that is processed by the light control system.

One embodiment of the headlight system includes features to limit the drift of the optical alignment of the headlight system when exposed to a range of physical environments which a vehicle may encounter. For example, the system may be optically or mechanically referenced to the vehicle chassis to ensure a high degree of position and orientation calibration down to sub-micron/sub arc second levels. As described above, the illumination system is capable of projecting structured light over a large depth of field, including projecting a pattern of illumination from multiple common aperture systems relative to the six Degrees Of Freedom (DOF) solution resulting from the internal localization algorithm.

With this light projecting structure, a real time distance map referenced to each headlight or camera position can be measured from a combination of structured light techniques and stereoscopic methods. In general, both the structured light and the stereoscopic methods utilize surface information for effective depth measurement (i.e., contrast for stereo, non-transparent moderate albedo for structured light, etc.). Therefore a robust definition of key points in the real world may be created and integrated into a 3D map dataset through classification techniques. For example, each location can be given a score for suitability of depth estimation, and key points may be defined as locations with high suitability. Instead of collecting and computing over a large dataset of poor quality distance information, a small number (~10) of high performance measurements can be defined and optimized for fast and robust localization calculations.

For each equipped vehicle that traverses a given scene, the key point locations can be measured relative to the six DOF model to estimate a localization error, and this information can be sent back to a common database. Statistical methods may be employed to optimize the effectiveness of the key point definitions, to minimize the information needed to achieve a required localization accuracy given an intrinsic key point density, for example. With the data from multiple vehicles passing through the same area over time, the precision of a given set of key points can be directly measured. Accuracy can be validated and quantified through various methods of calibration (such as using survey equipment like total station). These calibrated key points could be placed along the roadway, in signs or road markers as high contrast, easy to measure patterns for example to provide mitigation on potential systematic errors. These could be made of retro-reflective paint, for example, for identification by the light system of the vehicle.

In one implementation, if the performance of the key point set drops in time, a new set can be defined to improve the performance. For example, if a key point is associated with a building which is torn down or renovated, the next best key point, or multiple less effective key points in the area could be added to the list to make up for the lost key point. In general, the most recent set of key points for the anticipated route could be downloaded to the vehicle system prior to travel, embedded into map information as metadata for use by the vehicle or light control system in determining localization of the traveling vehicle.

As the vehicle passes initially through a new space without previously being through the area or receiving information from that particular area from a central database, the system could be placed into a more comprehensive mode for initial key point creation. These initial key points could be sent to the central database to be compared with other possible 3D source information to validate key point value. Further, during the day, the system could rely more on stereo imaging from a sunlit scene rather than from the relatively dim structured light illumination. However, ambient light mitigations solutions such as using narrowband filters in conjunction with a narrow band light source could be used to expand the use of structured light during the day. Night use may be more suitable for structured light measurements, or the system could be designed to provide even illumination over the key point regions. Another implementation may use the stereo system to operate in the near IR or non-visible wavelengths more suitable for nighttime operation.

Figure 14A:
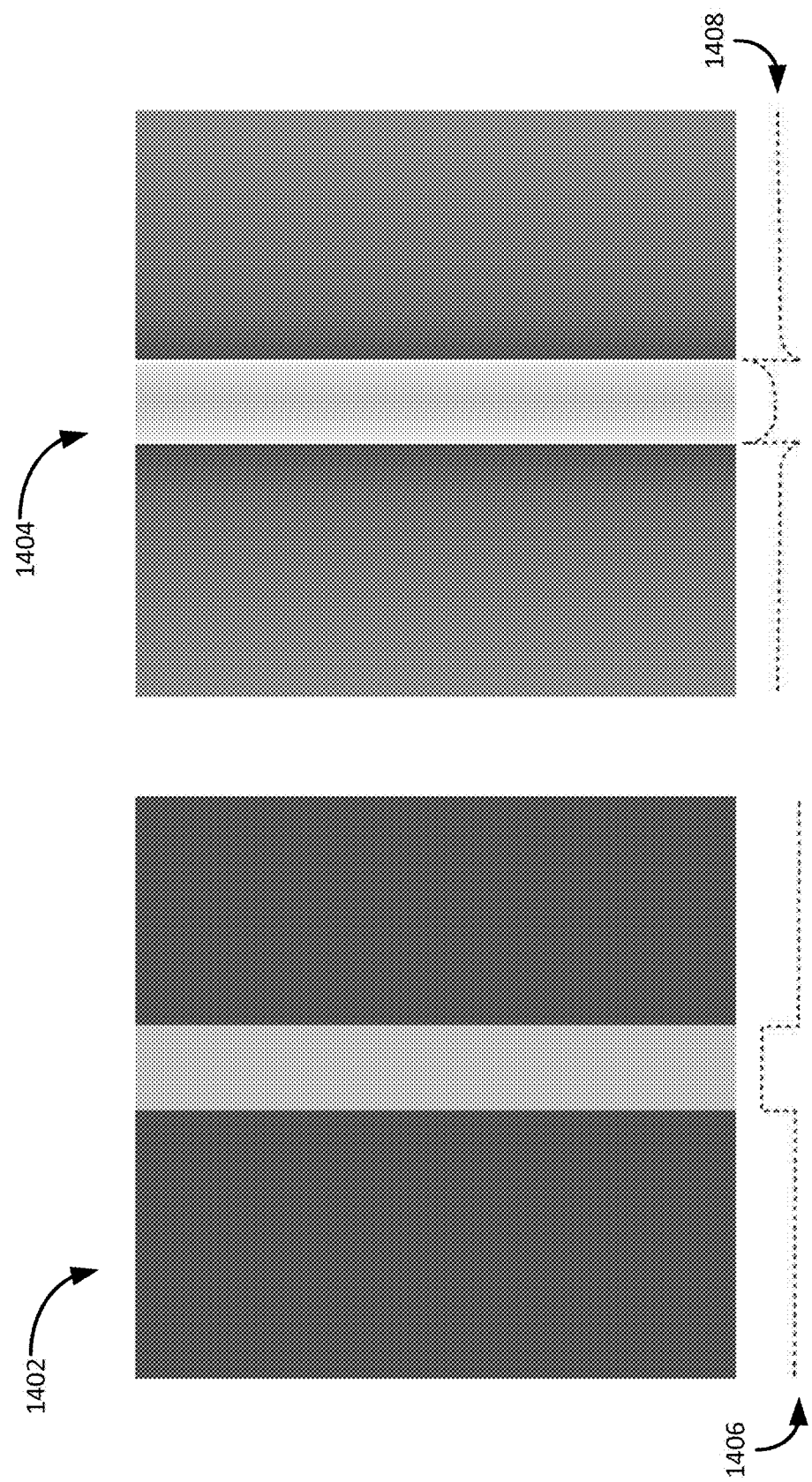

In addition, one or more illumination effects may also be applied to the scene from the illumination system to enhance the visibility of objects of surfaces within the scene. For example, FIGS. 14A and 14B are diagrams illustrating projecting illumination with a Cornsweet effect on a scene to enhance the visibility of lane markers on a road surface. In particular, FIG. 14A illustrates an example 1402 of the application of a contrast control illumination to a lane marker and an example 1404 of the application of contrast control illumination to a lane marker including a Cornsweet effect. As should be appreciated, however, the effect may be applied to any object or surface in a scene within the field of view of a projection or illumination system, as described above. Thus, the effect may be applied to traffic signs, animals, vehicles, surfaces, lines on surfaces, etc. within the scene.

In general, the Cornsweet effect provides a viewer with the illusion of darker or lighter region based on a light-to-dark transition or edge in the image. In effect, the region of the image adjacent to a light portion of the edge appears lighter, and a region adjacent to the dark portion of the edge appears darker to a human eye, even if both the image adjacent to the light portion of the edge and the region adjacent to the dark portion of the edge are of the same shade. By applying this effect around the edges of an object or portion of a surface within the scene, the interior of the object or surface may appear brighter to an observer of the scene. As such, objects within the scene may be more easily detected by the observer while potentially reducing the intensity and power utilized to illuminate the object or surface.

As mentioned, FIG. 14A illustrates an example 1402 of the application of a contrast control illumination to a lane marker without the use of the Cornsweet effect. A graph 1406 of the intensity of the illumination of the scene 1402 is provided in FIG. 14A and an illustration of the effect of the contrast control illumination on a lane marker of a road. As shown in graph 1406, the illumination is low or zero on the portions of the road that are black and higher on the lane marker. This effect is described above through the identification of the location of the lane marker within the scene and the illumination of the lane marker in the identified locations. Thus, the example 1402 shows the effect of illumination on the lane marker to highlight the lane marker within a field of view of a headlight or other illumination system.

Example scene 1404 of FIG. 14A illustrates the application of a contrast control illumination to a lane marker with the use of the Cornsweet effect. A graph 1408 of the intensity of the illumination of the scene 1404 is provided and an illustration of the effect of the contrast control illumination with the Cornsweet effect on a lane marker of a road. As shown in graph 1408, the illumination is low on the portions of the road that are black and higher on the lane marker. However, around the detected edges of the lane marker, a dark-to-light transition is provided through the illumination of the scene. In particular, the illumination provided to the scene 1402 includes lowering the intensity (or making it darker) on the road side of the edge of the lane marker and increasing the intensity (or shining more light) on the interior edge of the lane maker, as shown in graph 1408. By creating a dark-to-light transition along the edge of the lane maker, a Cornsweet effect is applied to the scene 1402. This effect provides the illusion that the interior of the lane marker as brighter than the rest of the road surface to a viewer. In other words, by applying the Cornsweet effect to the lane marker as shown, the lane marker appears brighter to a viewer in comparison to the rest of the roadway upon which the lane marker is applied than merely illuminating the entire scene with light. FIG. 14B illustrates an additional example 1450 of the application of a contrast control illumination to a lane marker and an additional example 1452 of the application of contrast control illumination to a lane marker including a Cornsweet effect.

In a similar manner, the Cornsweet effect may be utilized when illuminating any object or surface of a scene. For example, a lighting system may apply the same technique as described above to an object, such as a road sign, to make the sign appear brighter over conventional lighting schemes. In general, a lighting system may apply a dark-to-light transition along an edge of any portion of an illuminated scene to enhance the visibility of a surface or object within the scene.

Other visual effects may also be incorporated into the projection or lighting system to enhance features of the scene being illuminated. For example, FIG. 10 is a diagram illustrating projecting illumination with a colored boundary on one or more images of a scene to enhance the visibility of objects within the scene. Similar the illumination pattern that incorporates the Cornsweet effect discussed above, the lighting system may detect the edges of an object or surface within the scene and project a lighting effect around the edges of the object or surface. In this particular embodiment, the lighting system projects or shines a colored boundary 1506 around the interior edge of an object or surface. In general, a white area or surface may take on a pale tint of a brightly colored border surrounding it if the colored border is itself surrounded by a darker border. This effect is known as the watercolor illusion or watercolor effect. Through the application of the watercolor effect on an illuminated scene, white or other lightly colored surfaces or objects may appear to be colored without projecting a colored light onto the surface. This may increase the visibility of objects or surfaces in the scene while conserving energy consumption and providing faster projection of the light over traditional lighting systems.

FIG. 15 illustrates one example scene 1500 of the watercolor effect projected onto one or more lane markers 1504 of a road 1502. As described above, the lighting system may detect the lane markers 1504 within the scene and illuminate a lighting mask over the lane markers to improve the visibility of the markers. In this example, the lighting system may provide a watercolor effect to the lane markers 1504 such that a viewer can further distinguish the lane markers. To provide the watercolor effect, a colored border 1506 may be projected by the lighting system around the edge of the lane marker. As a result, the white interior portion of the lane marker 1504 may take on a colored tint of the projected colored border 1506 to a viewer of the scene 1500. The relative dark color of the road surface 1502 around the lane marker 1504 and the projected colored border 1506 may aid the lighting system in applying the watercolor effect to the lane marker.

In general, the lighting system may project any color or combination of colors 1506 around the edge of the lane marker 1504 to provide a colored tint to the marker. In one example, the system projects a yellow-colored border 1506 around the lane marker 1504 to provide a yellow tint to the interior of the lane marker. In another example, a green-colored border may be projected adjacent or near adjacent to the lane marker 1504 border with the rest of the street 1502. Further, a purple or other colored border may be projected between the green-colored border and the interior of the lane marker 1504. The combination of the green border and the purple border may give a watercolor effect to the lane marker 1504 such that the marker appears to have a colored tint. As mentioned, the use of the watercolor effect on a lane marker 1504, surface, or object in the scene may aid the system in illuminating portions of the scene while reducing power consumption and latency of traditional illumination systems.

Other visual effects may be included in the system to further improve the effectiveness and latency of illumination of the scene. For example and discussed above, the scene being illuminated may include a pedestrian or animal. In addition to the movement of the vehicle from which light is being projected onto the scene, the pedestrian or animal may also be moving through the scene. In this scenario, attempting to project a mask of illumination onto the moving object may not be properly aligned with the object due to processing latency within the system, potentially causing confusion to a viewer of the illuminated scene. Further, such masks, depending on the nature of the projected mask, may cover up information on the object being illuminated. To address these issues, one embodiment of the lighting system may project smaller illuminations onto the moving object that are easily perceptible to a human viewer that aid the viewer in identifying the object. By reducing the size and shape of the projected mask onto the moving object to particular locations within the object, the latency and power consumption of the lighting system are reduced when compared to projecting a matching mask over the object.

Figure 16:
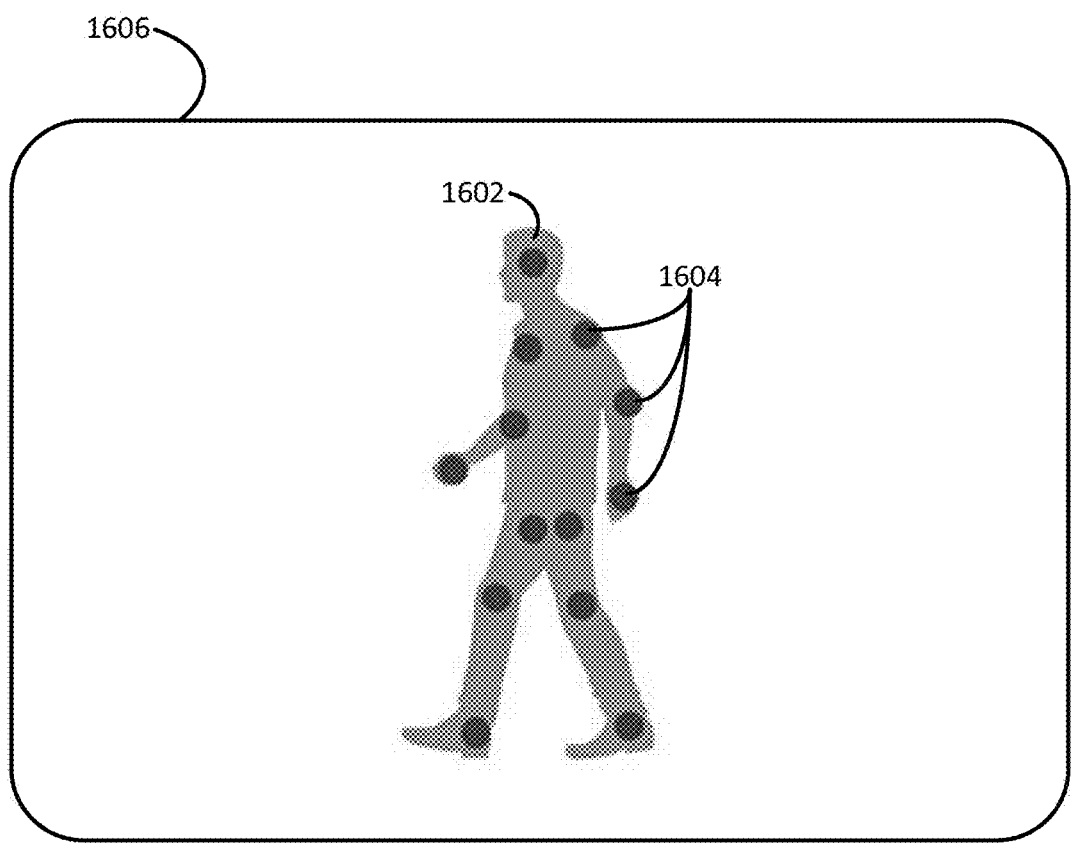
FIG. 16 is a diagram illustrating projecting illumination with highlighted portions on one or more images of a scene to enhance the visibility of objects within the scene.

FIG. 16 is a diagram illustrating projecting illumination with highlighted portions on one or more images of a scene to enhance the visibility of objects within the scene through a HUD viewer 1606. In particular, FIG. 16 includes a pedestrian object 1602 that may be present in an illuminated scene, such as within a field of view of a headlight projection system as described herein. In some embodiments, the projection system may determine the shape of the pedestrian 1602 and project a mask of uncolored or colored light onto the pedestrian to alert a viewer of the scene that the pedestrian is present. In general, the projection of the light on the pedestrian 1602 would occur within the HUD viewer 1606 such that the projected light would not be projected directly on pedestrian, but would rather appear on the pedestrian through the HUD viewer. However, as mentioned, projecting a mask onto the moving pedestrian 1602 may not always properly align on the pedestrian as the pedestrian and/or lighting system move through the scene. Thus, in another embodiment of the lighting system illustrated in FIG. 12, one or more dots of light 1604 may be projected onto the pedestrian 1602 to highlight the presence of the pedestrian in the scene. Projecting the one or more dots 1604 may increase the effectiveness of the illumination of the pedestrian 1602 (or other moving object in the scene) to a viewer of the scene.

In addition, the location of the projected dots 1604 may be dependent upon the object 1602 detected within the scene. For example, the lighting system may determine that the object 1602 is a pedestrian. Further, the lighting system may determine the approximate location of aspects of the pedestrian's 1602 anatomy within the scene, such as the pedestrian's wrists, elbows, hips, knees, shoulders, ankles, and the approximate center of the pedestrian's head. These locations may be illuminated with the projected dots 1604 as the pedestrian 1602 moves through the illuminated scene. The projected dots 1604 may be colored or non-colored light spots on the object. Further, although several projected dots 1604 are shown in FIG. 16, it should be appreciated that any number of such dots may be projected onto the object. Also, the projected dots 1604 may be any shape and size and not necessarily circular. As mentioned, illumination on the pedestrian 1602 would occur a HUD viewer 1606 such that the projected light would not be projected directly on pedestrian, but would rather appear on the pedestrian through the HUD viewer.

As the pedestrian 1602 moves, the accompanying movement of the projected dots 1604 provides an indication to a viewer of the scene of the biological motion of the pedestrian such that the viewer may determine that a pedestrian 1602 is illuminated and the relative movement of the pedestrian. Evidence indicates that the movements of the projected dots 1604 on the pedestrian 1602 are especially noted to determine the biological motion perception of a human. Thus, rather than projecting a mask over the entire pedestrian 1602, the lighting system may indicate the presence and movement of the pedestrian to a viewer of the scene through the use of the projected dots 1604. A similar approach may be used for other moving objects within the scene, such as animals or vehicles to show the movement of the object through the scene. In this manner, the moving object may be illuminated within the scene such that the movement of the object is detectable in an efficient and power saving way.

As discussed above, the particulars of the contrast control feature applied to a field of view of a headlight is configurable to a user preference, region preference, or the like. In one implementation, the contrast control settings are updateable through a software update to the light control system that includes one or instructions or settings on the illumination levels to apply in a contrast control feature of the light system. Thus, as new standards or minimum thresholds for headlight illumination are released by one or more governing bodies, the contrast control feature of the light control system may be updated through a software or firmware update to the system. In this manner, the light control system may be updated to the most recent requirements without the need to replace the entire headlight assembly.

Although discussed above as methods described by the flowcharts of FIGS. 1, 4, and 7, it should be appreciated that one or more operations may be omitted from the methods discussed. For example, the one or more user preferences may not be received from the user in the method of FIG. 7. Further, the operations may be performed in any order and do not necessarily imply an order as provided. Rather, the methods discussed are merely one embodiment of the present disclosure as contemplated.

Embodiments of the present disclosure include various operations or steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

While the present disclosure has been described with reference to various implementations, it will be understood that these implementations are illustrative and that the scope of the disclosure is not limited to them. Many variations, modifications, additions, and improvements are possible. More generally, implementations in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method for illuminating a field of view for a vehicle, the method comprising:
    receiving scene information of the field of view for the vehicle from one or more sensors in communication with a light controller;
    analyzing the scene information to detect a presence of an object in the field of view;
    classifying the object using the scene information and a database of known object profiles;
    predicting a location of the classified object within the field of view of the vehicle; and
    projecting, utilizing the light controller, an illuminated indicator at the predicted location of the classified object in the field of view of the vehicle.

2. The method of claim 1 wherein the illuminated indicator is an image projected into the field of view of the vehicle.

3. The method of claim 1 wherein the illuminated indicator is an image projected onto a heads-up display (HUD) device.

4. The method of claim 1 wherein the illuminated indicator comprises a colored spotlight illumination.

5. The method of claim 1 wherein the one or more sensors comprise a thermal infra-red sensor and the scene information is a thermal signature of the object.

6. The method of claim 1 wherein the predicted location of the classified object within the field of view is based at least on a velocity vector of the vehicle.

7. The method of claim 6 wherein the predicted location of the classified object within the field of view is further based at least on a determined latency in the analyzing of the scene information.

8. The method of claim 1 wherein the projected illuminated indicator comprises a visual effect to enhance a visibility of the object.

9. The method of claim 8 further comprising detecting an approximate boundary of the object in the field of view and wherein the visual effect to enhance the visibility of the object comprises a Cornsweet effect projected onto the boundary of the object comprising a darker-to-lighter transition from a surface of the field of view exterior to the object to a surface of the field of view interior to the object and along the boundary of the object.

10. A system for illuminating a field of view for a vehicle, the system comprising:
    a projection system projecting light onto the field of view of the vehicle;
    a sensor to detect objects within the field of view of the vehicle; and
    a computing device executing one or more instructions that cause the computing device to perform operations of:
        receiving a signal from the sensor indicating scene information of the field of view for the vehicle;
        analyzing the scene information to detect a presence of an object in the field of view;
        classifying the object using the scene information and a database of known object profiles;
        predicting a location of the classified object within the field of view of the vehicle; and
        instructing the projection system to project an illuminated indicator at the predicted location of the object in the field of view of the vehicle.

11. The system of claim 10 wherein the projection system comprises:
    a light source comprising an array of light emitting diodes (LEDs) with red elements for red light emissions, green elements for green light emissions, and blue elements for blue light emissions.

12. The system of claim 10 wherein the projection system comprises:
    a laser projector for laser printing on the object in the field of view of the vehicle.

13. The system of claim 10 wherein the sensor comprises a Light Detection and Ranging (LIDAR) detector that illuminates the objects within the field of view of the vehicle with a laser and analyzes the light reflected back off the objects.

14. The system of claim 10 wherein the sensor comprises a thermal infra-red sensor and the scene information from the sensor is a thermal signature of a detected object.

15. The system of claim 10 wherein the illuminated indicator comprises a colored spotlight illumination.

16. The system of claim 10 wherein the sensor comprises a thermal infra-red sensor.

17. The system of claim 10 wherein the predicted location of the classified object within the field of view is based at least on a velocity vector of the vehicle.

18. The system of claim 10 wherein the predicted location of the classified object within the field of view is further based at least on a determined latency in the analyzing of the scene information.

19. The system of claim 10 wherein the projected illuminated indicator comprises a visual effect to enhance a visibility of the object.

20. The system of claim 19 wherein the one or more instructions cause the computing device to further perform an operation of detecting an approximate boundary of the object in the field of view and wherein the visual effect to enhance the visibility of the object comprises a Cornsweet effect projected onto the boundary of the object comprising a darker-to-lighter transition from a surface of the field of view exterior to the object to a surface of the field of view interior to the object and along the boundary of the object.

* * * * *